US008405735B2

(12) United States Patent
Miyakoshi

(10) Patent No.: US 8,405,735 B2
(45) Date of Patent: Mar. 26, 2013

(54) SYSTEM AND METHOD FOR CONTROLLING RECORDING IN AN IMAGE PROCESSING APPARTUS IN A SLOW MOTION TAKING MODE

(75) Inventor: Daisuke Miyakoshi, Kanagawa (JP)

(73) Assignee: Sony Corporation (JP)

( * ) Notice: Subject to any disclaimer, the term of this patent is extended or adjusted under 35 U.S.C. 154(b) by 523 days.

(21) Appl. No.: 12/312,949

(22) PCT Filed: Aug. 27, 2007

(86) PCT No.: PCT/JP2007/067082

§ 371 (c)(1), (2), (4) Date: Nov. 2, 2009

(87) PCT Pub. No.: WO2008/068933

PCT Pub. Date: Jun. 12, 2008

(65) Prior Publication Data

US 2010/0045812 A1 Feb. 25, 2010

(30) Foreign Application Priority Data

Nov. 30, 2006 (JP) ................................. 2006-322864

(51) Int. Cl.
*H04N 5/228* (2006.01)

(52) U.S. Cl. .................................................... 348/222.1

(58) Field of Classification Search ................ 348/222.1
See application file for complete search history.

(56) References Cited

U.S. PATENT DOCUMENTS

| | | | | |
|---|---|---|---|---|
| 5,034,811 | A | 7/1991 | Palm | |
| 5,884,042 | A * | 3/1999 | Winter et al. | 709/231 |
| 7,446,299 | B2 * | 11/2008 | Kobayashi | 250/216 |
| 2008/0049121 | A1 * | 2/2008 | Tsujimura et al. | 348/231.99 |
| 2008/0129825 | A1 * | 6/2008 | DeAngelis et al. | 348/169 |

FOREIGN PATENT DOCUMENTS

| | | | |
|---|---|---|---|
| EP | 1035510 | A2 | 9/2000 |
| EP | 1429334 | A2 | 6/2004 |
| JP | 09-055931 | A | 2/1997 |
| JP | 09-083952 | A | 3/1997 |
| JP | 2001-103356 | A | 4/2001 |
| JP | 2001-358984 | A | 12/2001 |
| JP | 2004-289766 | A | 10/2004 |
| JP | 2004-336108 | A | 11/2004 |
| JP | 2005-328168 | A | 11/2005 |
| JP | 2006-166077 | A | 6/2006 |
| WO | 2005099423 | A2 | 10/2005 |
| WO | WO 2006009521 | A1 * | 1/2006 |
| WO | WO 2006120814 | A1 * | 11/2006 |

OTHER PUBLICATIONS

Supplementary European Search Report EP 07806555, dated Aug. 4, 2010.

* cited by examiner

*Primary Examiner* — Usman Khan
*Assistant Examiner* — Gary C Vieaux
(74) *Attorney, Agent, or Firm* — Lerner, David, Littenberg, Krumholz & Mentlik, LLP

(57) ABSTRACT

Application is found to, for example, a video camera with recording means united therewith. On the basis of image recognition results, in accordance with the timing of detection of images of specified pattern in specified sequence, high-speed writing of imaging results in memory is completed and the imaging results stored in the memory is saved in a recording medium.

8 Claims, 17 Drawing Sheets

| COORDINATE A | COORDINATE B | THRESHOLD |
|---|---|---|
| (10,10) | (3,3) | 20 |
| (3,3) | (10,3) | 10 |
| ⋮ | | |

SYSTEM AND METHOD FOR CONTROLLING RECORDING IN AN IMAGE PROCESSING APPARTUS IN A SLOW MOTION TAKING MODE

CROSS-REFERENCES TO RELATED APPLICATIONS

The present application is a national phase entry under 35 U.S.C. §371 of International Application No. PCT/JP2007/067082 filed Aug. 27, 2007, published on Jun. 12, 2008 as WO 2008/068933 A1, which claims priority from Japanese Patent Application No. JP 2006-322864 filed in the Japanese Patent Office on Nov. 30, 2006.

BACKGROUND OF THE INVENTION

1. Technical Field

The present invention relates to an imaging apparatus, a method of controlling the imaging apparatus, a program for the method of controlling the imaging apparatus, and a recording medium recording the program for the method of controlling the imaging apparatus and is applicable to a video camera with recording means integrated for example. The present invention is intended to surely take slow motion images of a desired scene by ending the high-speed writing of an imaging result to a memory and then reading the imaging result from this memory for recording with reference to a timing at which images of a particular pattern are detected in a particular sequence on the basis of an image recognition result.

2. Background Art

Conventionally, Japanese Patent Laid-open No. Hei 9-83952 discloses a method of recording image results to a recording medium by in a delayed manner based on the use of a large-capacity memory. According to the technique disclosed in this Japanese Patent Laid-open No. 9-83952, recording can be made starting with a video at a moment prior by a certain period of time to a moment at which a user commanded to start image taking, thereby allowing the user to capture precious shooting chances.

A video camera is recently provided in which a field frequency as an imaging result is reduced by use of a memory to record slow-motion videos. Namely, this video camera outputs an imaging result from an imaging device at a field frequency of 240 [fps], for example, higher than a field frequency 50 [fps (field/second)] or 60 [fps] or a normal video signal and sequentially stores in a memory. Also, this video camera reads the image result stored in the memory at a filed frequency of a normal video signal to record to a recording medium. It should be noted that the memory is configured by SDRAM (Synchronous Dynamic Random Access Memory) for example and the recording medium is configured by a magnetic disk, an optical disk, a hard disk, or the like. In what follows, the processing of lowering the field frequency of an imaging result by use of a memory to record slow-motion video is referred to as slow-motion video taking. With is video camera, a period of time in which slow-motion taking is executed is determined with reference to a point of time at which a control is operated.

However, in slow-motion video taking, golf swing, tennis swing, baseball bat swing, and the like may be taken; in such a case, determining a slow-motion video taking period with reference to a control operating time may cause a problem of the disability of not always accurately taking a desired scene.

Namely, in this case, the operation of a control may be too fast or too slow, thereby taking a wasted part or failing to take an essential part.

One of methods of solving this problem may be a method of making a reference of ball hit sound for example. However, with this method, it is possible, in an environment where there is a possibility of picking up many similar sounds, to start taking with reference to a hit sound made by another player. Therefore, even this method presents a problem of the inability of accurately executing slow-motion taking of a desired scene.

There is still another method as disclosed in Japanese Patent Laid-open No. Hei 9-55931 in which video taking is executed with reference to a point of time at which a moving object is detected. In the case of this method, if video taking is started with a still scene, such as in the case of a blown balloon or a milk crown, for example, a desired scene can be taken accurately. However, with this method, a problem may be presented that, in recording a particular scene of moving video images, such as a particular scene of sport for example, a desired scene may be not accurately taken in slow motion.

DISCLOSURE OF INVENTION

It is therefore an object of the present invention to propose an imaging apparatus, a method of controlling the imaging apparatus, a program for the method of controlling the imaging apparatus, and a recording medium recording the program for the method of controlling the imaging apparatus.

In carrying out the invention and according to one aspect thereof, there is provided an imaging apparatus. This imaging apparatus has an imaging block configured to output an imaging result; a memory configured to store an imaging result outputted from the imaging block and output an imaging result; a recording medium configured to record an imaging result outputted from the imaging block or outputted from the memory; an image recognition block configured to image-recognize the imaging result and output an image recognition result; and a control block configured to control an operation of each block. In this configuration, the control block, in a standard operation mode, outputs the imaging result from the imaging block at a first field frequency or a frame frequency to record the imaging result to the recording medium and, in a slow-motion taking mode, outputs the imaging result from the imaging block at a second field frequency or frame frequency higher than the first field frequency or frame frequency to sequentially cyclically store the imaging result to the memory, and on the basis of the image recognition result, ends storing of the imaging result into the memory with reference to a timing with which a particular pattern in the imaging result is detected in a predetermined sequence, and reads the imaging result stored in the memory at a third field frequency or frame frequency lower than the second field frequency or frame frequency to record the imaging result to the recording medium.

In carrying out the invention and according to another aspect thereof, there is provided a control method for an imaging apparatus having an imaging block configured to output an imaging result; a memory configured to store an imaging result outputted from the imaging block and output an imaging result; a recording medium configured to record an imaging result outputted from the imaging block or outputted from the memory; an image recognition block configured to image-recognize the imaging result and output an image recognition result. This control method has a recording step of a standard operation mode in which, in the standard operation mode, the imaging result is outputted from the imaging block at a first field frequency or frame frequency to be recorded to the recording medium; a writing step of a slow-motion taking mode in which, in the slow-motion taking mode, the imaging result is outputted from the imaging block at a second field frequency or frame frequency higher than the first field frequency or frame frequency to be sequentially cyclically stored in the memory; and a recording step of the slow-motion taking mode in which, in the slow-motion taking mode, on the basis of the image recognition result, with reference to a timing with which a particular pattern is detected in a predetermined sequence in the imaging result, storing of the imaging result into the memory is ended and the imaging result stored in the memory is read at a third field frequency or frame frequency lower than the second field frequency or frame frequency to be recorded to the recording medium.

In carrying out the invention and according to still another aspect thereof, there is provided a program of a control method for an imaging apparatus having an imaging block configured to output an imaging result; a memory configured to store an imaging result outputted from the imaging block and output an imaging result; a recording medium configured to record an imaging result outputted from the imaging block or outputted from the memory; an image recognition block configured to image-recognize the imaging result and output an image recognition result. This control method has a recording step of a standard operation mode in which, in the standard operation mode, the imaging result is outputted from the imaging block at a first field frequency or frame frequency to be recorded to the recording medium; a writing step of a slow-motion taking mode in which, in the slow-motion taking mode, the imaging result is outputted from the imaging block at a second field frequency or frame frequency higher than the first field frequency or frame frequency to be sequentially cyclically stored in the memory; and a recording step of the slow-motion taking mode in which, in the slow-motion taking mode, on the basis of the image recognition result, with reference to a timing with which a particular pattern is detected in a predetermined sequence in the imaging result, storing of the imaging result into the memory is ended and the imaging result stored in the memory is read at a third field frequency or frame frequency lower than the second field frequency or frame frequency to be recorded to the recording medium.

In carrying out the invention and according to yet another aspect thereof, there is provided a recording medium recording a program of a control method for an imaging apparatus having an imaging block configured to output an imaging result; a memory configured to store an imaging result outputted from the imaging block and output an imaging result; a recording medium configured to record an imaging result outputted from the imaging block or outputted from the memory; an image recognition block configured to image-recognize the imaging result and output an image recognition result. This control method has a recording step of a standard operation mode in which, in the standard operation mode, the imaging result is outputted from the imaging block at a first field frequency or frame frequency to be recorded to the recording medium; a writing step of a slow-motion taking mode in which, in the slow-motion taking mode, the imaging result is outputted from the imaging block at a second field frequency or frame frequency higher than the first field frequency or frame frequency to be sequentially cyclically stored in the memory; and a recording step of the slow-motion taking mode in which, in the slow-motion taking mode, on the basis of the image recognition result, with reference to a timing with which a particular pattern is detected in a predetermined sequence in the imaging result, storing of the imaging result into the memory is ended and the imaging result stored in the memory is read at a third field frequency or frame frequency lower than the second field frequency or frame frequency to be recorded to the recording medium.

According to the configuration of this invention, a period in which slow-motion taking is executed is set on the basis of an image recognition result with reference to a timing with which a particular pattern is detected in a predetermined sequence in an imaging result. Therefore, slow-motion taking can be surely executed on a desired scene as compared with the case in which a control is operated in each case and the case in which sound is used for a trigger.

According to this invention, slow-motion taking can be surely executed on a desired scene.

BRIEF DESCRIPTION OF DRAWINGS

FIGS. 4(A) and 4(B) are schematic diagrams for describing contents of the memory shown in FIG. 3;

BEST MODE FOR CARRYING OUT THE INVENTION

This invention will be described in further detail by way of example with reference to the accompanying drawings.

(1) A Configuration of Embodiment 1

Figure 1:
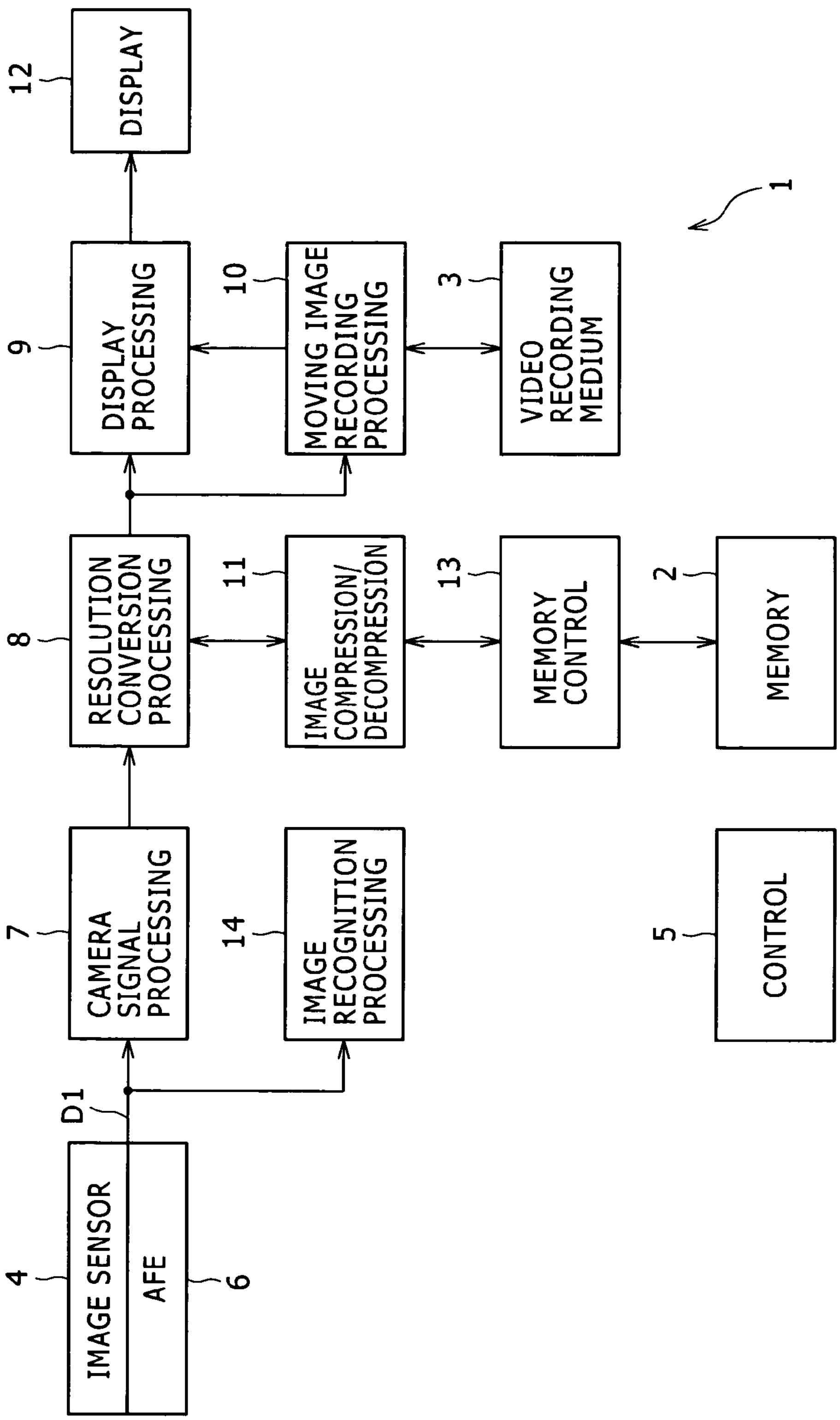
FIG. 1 is a block diagram illustrating an imaging apparatus practiced as embodiment 1 of the present invention.

FIG. 1 is a block diagram illustrating an imaging apparatus practiced as embodiment 1 of the present invention. This imaging apparatus 1 executes operation mode switching between a standard operation mode that is an operation mode at the time of normal taking and a slow-motion taking mode by a user operation. This imaging apparatus 1, in this slow-motion taking mode, converts a field frequency that is an imaging result by use of memory 2 and records a slow-motion video to a video recording medium 3.

Here, in the imaging apparatus 1, an image sensor 4 is a solid-state imaging device, such as an image device of CMOS (Complementary Metal Oxide Semiconductor) type. The imaging sensor 4 executes photoelectric conversion on an optical image formed on an imaging surface through an optical system, not shown, and outputs an imaging signal that is a result of the imaging. It should be noted that, in this embodiment, the imaging sensor 4 has a CDS (Correlated Double Sampling) block and executes correlated double sampling processing on the image signal to output the imaging signal thus processed.

The imaging sensor 4 switches operations under the control of a control block 5; an imaging result is outputted at field frequency 60 [fps] specified in NTSC in the standard operation mode and an imaging result is outputted at a field frequency higher than this standard rate in the slow-motion taking mode. In this embodiment, this high-speed field frequency is field frequency 240 [fps] that is four times as high as the field frequency in the standard operation mode. It should be noted that, in outputting an imaging signal for one line, the imaging sensor 4 uses a function thereof of adding an output signal of a same-color photo sensor horizontally arranged adjacent to the imaging sensor 4 to the imaging sensor and outputting a resultant signal. In the slow-motion taking mode, the imaging sensor 4 uses this function and execute pixel skipping to output a resultant imaging signal, thereby preventing the rate of the imaging signal from increasing. It should be noted that, if a following processing block has sufficient processing speeds, this pixel skipping processing may be omitted and the number of pixels to be added may be controlled to output an imaging signal at a given rate.

An AFE (Analog Front End) 6 executes AGC (Automatic Gain Control) processing on the imaging signal outputted from the imaging sensor 4 to control the gain of the imaging signal and then executes analog-to-digital conversion processing on the imaging signal to output image data D1.

A camera signal processing block 7 executes camera signal processing on the image data outputted from the AFE 6 and outputs the resultant image data. It should be noted that the camera signal processing herein denotes white balance adjustment processing, color correction processing, AF (Auto Focus) processing, and AE (Auto Exposure) processing, for example.

A resolution conversion processing block 8 takes in image data D1 processed by the camera signal processing block 7 in the standard operation mode and outputs this image data D1 to a moving image recording processing block 10 for recording. Also, the resolution conversion processing block 8 converts the resolution of this image data D1 into a resolution suitable for displaying on a display block 12 and outputs the converted image data to a display processing block 9.

In the slow-motion taking mode, the resolution conversion processing block 8 also skips fields of image data D1 having field frequency 240 [fps] processed in the camera signal processing block 7 and outputs the resultant image data to the display processing block 9 at field frequency 60 [fps] for being displayed on the monitor. The resolution conversion processing block 8 also adjusts the size of image data D1 having field frequency 240 [fps] processing in the camera signal processing block 7 and outputs the resultant image data to an image compression/decompression block 11 for recording to the memory 2. It should be noted that this size adjustment processing changes the format of image data D1 so as to make compliant with the specifications of the memory 2; therefore, if the image compression/decompression block 11 or the memory 2 has enough processing power, this size adjustment processing may be omitted.

Also, in the slow-motion taking mode, the resolution conversion processing block 8 switches between operations under the control of the control block 5 obtains the image data having field frequency 60 [fps] outputted from the image compression/decompression block 11 instead of image data D1 having field frequency 240 [fps] processed by the camera signal processing block 7. The resolution conversion processing block 8 outputs this image data to the moving image recording processing block 10 for recording. In addition, this resolution conversion processing block 8 converts the resolution of this image data into a resolution suitable for display on a display block 12 and outputs the converted image data to the display processing block 9.

The display block 12 is configured by an LCD (Liquid Crystal Display) for example. The display processing block 9 drives the display block 12 on the basis of the image data for the monitor outputted from the resolution conversion processing block 8 to display a monitor image that is an imaging result onto the display block 12. If a moving image recorded to the video recording medium 3 is monitored by switching between operations under the control of the control block 5, the display block 12 is driven by the image data outputted from the moving image recording processing block 10, displaying the moving image recorded to the video recording medium 3 onto the display block 12. It should be noted that, instead of being displayed on the display block 12, the image data may be outputted outside.

The moving image recording processing block 10 executes, at the time of recording to the video recording medium 3, data compression processing on the image data for recording outputted from the resolution conversion processing block 8 by moving image coding algorithm, such as MPEG (Moving Picture Experts Group) for example, and records the compressed image data to the video recording medium 3. Also, the moving image recording processing block 10 switches between operations under the control of the control block 5 to reproduce the moving image recorded to the video recording medium 3 and decompress the reproduced moving image, thereby outputting the decompressed image data to the display processing block 9. The video recording medium 3 is a recording medium based on hard disk drive, optical disk device, or a memory card, for example.

In the slow-motion taking mode, the image compression/decompression block 11 executes data compression processing on the image data outputted from the resolution conversion processing block 8 for recording to the memory 2 by s still-image encoding algorithm, such as (Joint Photographic Experts Group), for example. Also, the encoded data obtained by the data compression is outputted to a memory control block 13. In addition, in the slow-motion taking mode, the image compression/decompression block 11 switches between operations under the control of the control block 5 and executes data decompression processing on the coded data outputted from the memory control block 13 to decode the image data and outputs the decoded image data to the resolution conversion processing block 8.

In the slow-motion taking mode, the memory control block 13 sequentially cyclically records the encoded data having field frequency 240 [fps] outputted from the image compression/decompression block 11 to the memory 2. It should be noted that the memory 2 is configured by an SDRAM for example. Also, in the slow-motion taking mode, the memory control block 13 switches between operations under the control of the control block 5 sequentially reads the encoded data from the memory 2 to output the encoded data to the image compression/decompression block 11. In reading the encoded from this memory 2, the memory control block 13 reads the encoded data at field frequency 60 [fps] that is ¼ the speed of recording.

In the slow-motion taking mode, an image recognition processing block 14 executes image recognition processing on the image data outputted from the AFE 6 by applying a pattern patching technique to detected a particular pattern indicated by the control block 5 from the imaging result. The image recognition processing block 14 transmits this detection result to the control block 5.

Figure 2:
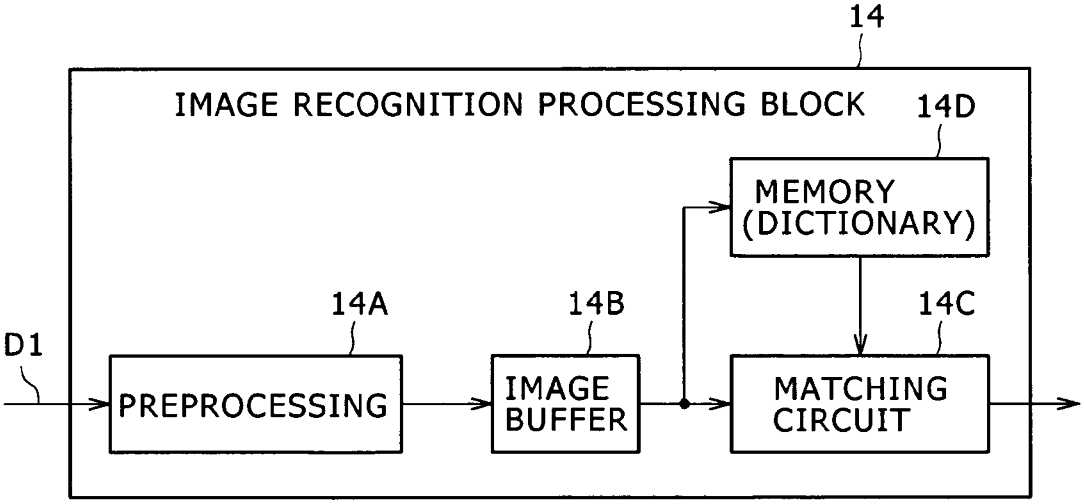
FIG. 2 is a block diagram illustrating a detail configuration of an image recognition processing block of the imaging apparatus shown in FIG. 1.

Now, referring to FIG. 2, there is shown a block diagram illustrating a detail configuration of the image recognition processing block 14. The image recognition processing block 14 enters the image data outputted from the AFE 6 into a preprocessing block 14A to execute preprocessing, such as noise cancellation processing, image size normalization processing, and feature extraction processing, for example. Also, the image recognition processing block 14 temporarily stores the image data into a following image buffer 14B to hold therein and executes pattern matching processing in a matching circuit 14C.

Here, the matching circuit 14C executes pattern matching processing by use of a dictionary stored in a memory 14D by use of a boosting method based on the pixel difference between two points. The boosting herein denotes a statistical image recognition technique that configures an effective discriminator (a strong discriminator) by combining weak discriminators that are slightly higher in performance than the random; for a mathematical framework, ada boost method is generally known. In the slow-motion taking mode, the image recognition processing block 14 detects the image pattern indicated by the control block 5 at each field by this ada boost method and transmits the presence or absence of this image pattern and the location of this image pattern to the control block 5.

Figures 3, 4:
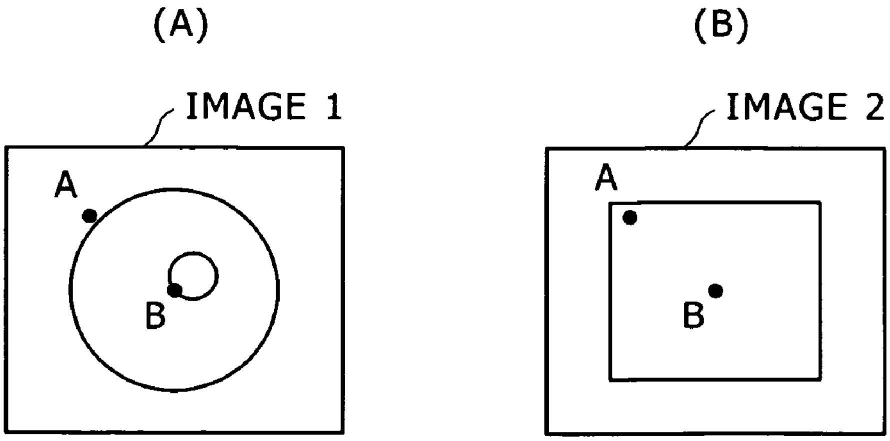
FIG. 3 is a schematic diagram illustrating a configuration of a memory of the image recognition processing block shown in FIG. 2.

In order to do this, the image recognition processing block 14 registers an image difference table of this particular image pattern into the memory 14D as shown in FIG. 3. It should be noted that the image difference table is herein also referred to as a dictionary. As shown in FIG. 3, the image difference table contains the registration of the pixel values of two points on a particular image pattern subject to detection and a threshold value for decision reference set with reference to these two-point pixel value difference values. It should be noted that FIG. 4(A) and FIG. 4(B) illustrate that the image patterns subject to detection are circular and rectangular, respectively.

The imaging apparatus 1 is configured to be able of select a desired taking mode from two or more image modes in the slow-motion taking mode, in which a particular image pattern is set for each taking mode. Therefore, an image difference table is arranged in the memory 14D for each taking mode. It should be noted that, if an accuracy that is practically enough can be ensured, an image difference table may be shared by two or more taking modes.

The matching circuit 14C sets a pattern matching area on an image of image data temporarily stored in the image buffer 14B and sequentially moves this pattern matching areas in a sequence of raster scan for example. With reference to a feature point detected by feature point detection, the matching circuit 14C calculates a pixel difference value between coordinates corresponding to the recording of a pixel difference table from the pattern matching area, for each scan position. Also, the matching circuit 14C determines the calculated pixel difference value by a threshold value of the image difference table to set weak hypothesis whether an image pattern subject to detection exists in that pattern matching area. It should be noted that, if the existence of an image pattern subject to detection is possible, the matching circuit 14C sets weak hypothesis to value 1; if the existence of an image pattern subject to detection is impossible, the matching circuit 14C sets weak hypothesis to value −1.

The matching circuit 14C accumulatively adds this detection of weak hypothesis two or more times for each scan position and, if an accumulatively added value is in excess of a certain threshold value, determines that an image pattern subject to detection exists for each pattern matching area.

It should be noted that, in the present embodiment, the matching circuit 14C executes the sequence of processing by use of only a luminance signal in image data D1; it is also practicable to execute a particular image pattern detection in combination with color detection processing based on color information or in combinations with other two or more detection processing operations. Further, instead of the boosting technique, GA (Genetic Algorithms) may be used. When only a moving object is recognized, a moving vector detected by the moving image recording processing block 10 may be used. It should be noted that the pattern recognition processing based on the combination with other techniques as described above can speed up the processing rate and enhance the processing accuracy.

The control block 5 is control means for controlling operations of the imaging apparatus 1 in its entirety, executing a program recorded to a memory, not shown, to control an operation of each component block of the imaging apparatus 1. In the present embodiment, this program is provided as installed in the imaging apparatus 1 in advance; however, it is also practicable to provide this program as recorded to a recording medium, such as an optical disk or a memory card, instead of this preinstallation or as downloaded via a network, such as the Internet. It is also practicable to make the control block 5 execute the image recognition processing in the image recognition processing block 14.

Namely, the control block 5 controls an operation of the imaging sensor 4 so as to obtain an imaging result at field frequency 60 [fps] in the standard operation mode and controls the AFE 6, the camera signal processing block 7, the resolution conversion processing block 8, and the display processing block 9 so as to display an imaging result of this field frequency 60 [fps] on the display block 12. Therefore, in this case, in the imaging apparatus 1, the imaging result of field frequency 60 [fps] is processed in the AFE 6, the camera signal processing block 7, the resolution conversion processing block 8, and the display processing block 9 in this order to be displayed on the display block 12. Also, when the user operates a trigger switch for recording start, the control block 5 instructs the moving image recording processing block 10 to start an operation, sequentially compressing, in the moving image recording processing block 10, the image data of field frequency 60 [fps] outputted from the resolution conversion processing block 8 while displaying a monitor image on the display block 12, recording the image data to the video recording medium 3. When the user operates the trigger switch again in this state, the control block 5 instructs the moving image recording processing block 10 to stop the operation, thereby stopping the recording of the image data.

When the user gives an instruction for the reproduction of the video recording medium 3, the control block 5 instructs the moving image recording processing block 10 to reproduce the video recording medium 3 to sequentially decompress the encoded data recorded to the video recording medium 3 in the moving image recording processing block 10, outputting the decompressed data to the display processing block 9 to display this image data on the display block 12.

Figure 5:
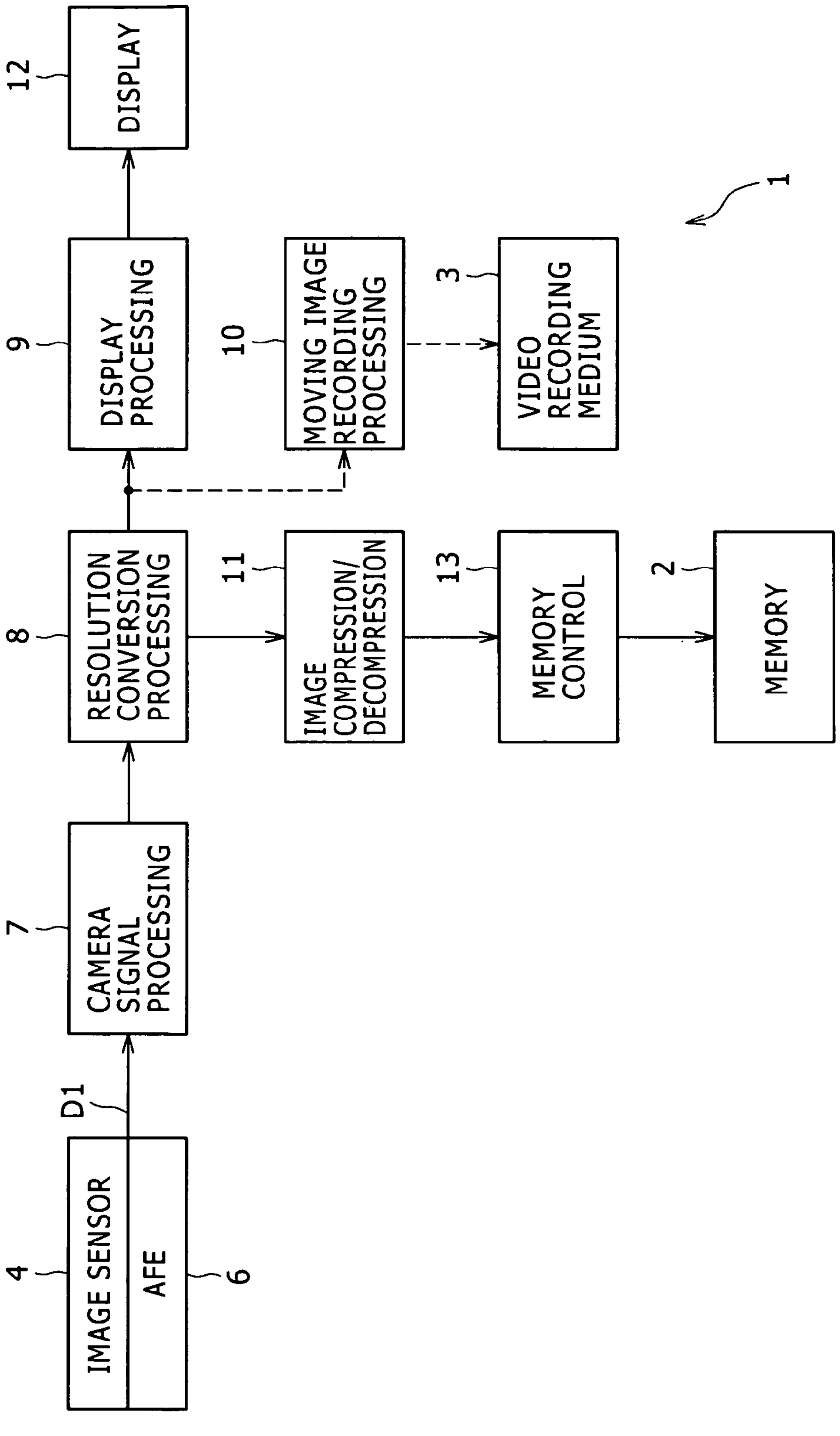
FIG. 5 is a block diagram illustrating a flow of image data in a slow-motion taking mode of the imaging apparatus shown in FIG. 1.

On the other hand, if the user gives an instruction of the slow-motion taking mode, the control block 5 instructs each component block to switch the operation mode to the slow-motion taking mode with predetermined timing, thereby obtaining an imaging result of field frequency 240 [fps] in the imaging sensor 4. As shown in FIG. 5 in comparison with FIG. 1, while converting this imaging result of field frequency 240 [fps] into the image data of field frequency 60 [fps] in the resolution conversion processing block 8 and displaying this image data on the display block 12, the imaging result of field frequency 240 [fps] is sequentially cyclically recorded to the memory 2.

Figure 6:
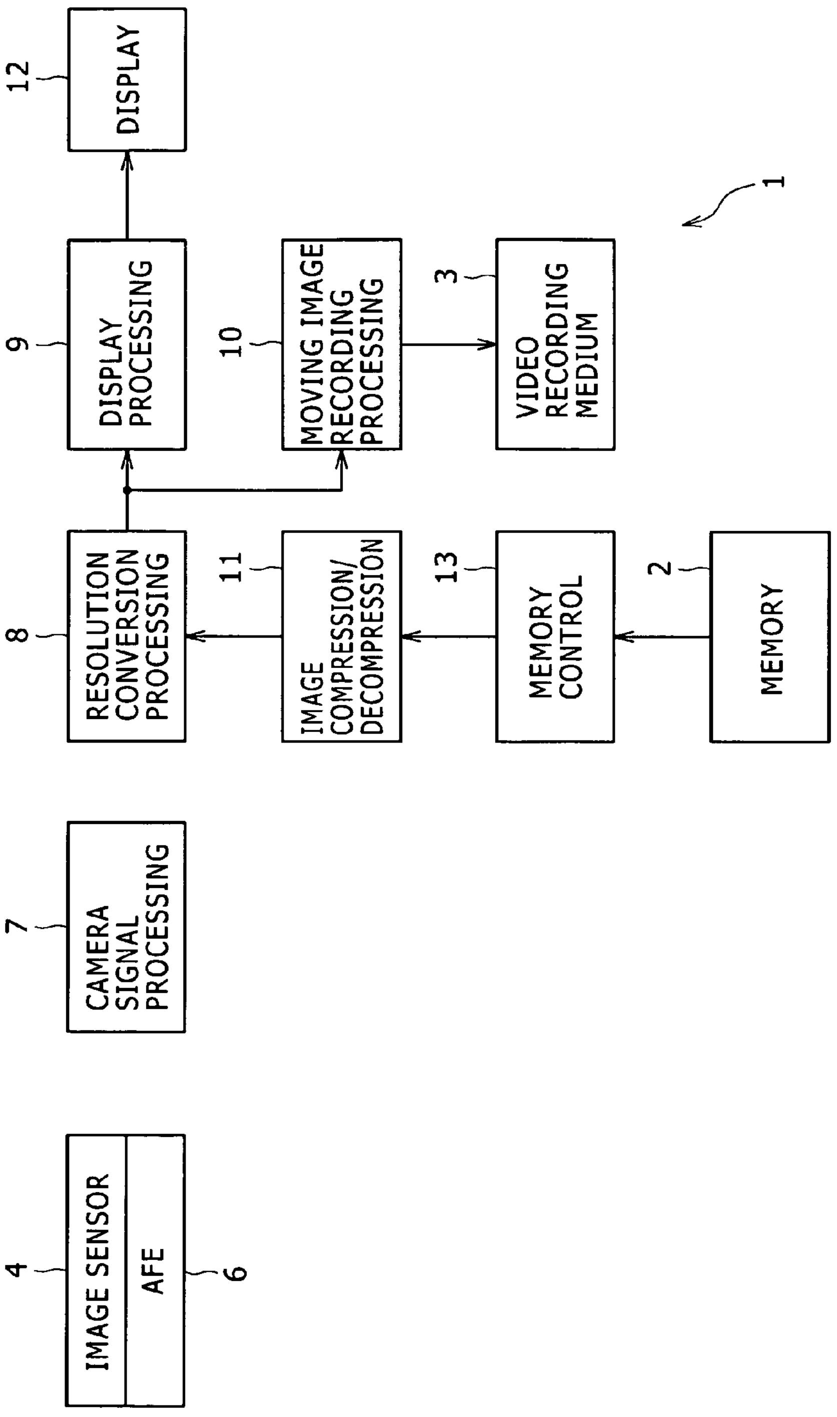
FIG. 6 is a block diagram continued from FIG. 5.

The control block 5 switches operations of each component block with predetermined timing, as shown in FIG. 6 in comparison with FIG. 5, read the imaging result of field frequency 240 [FPS] stored in the memory 2 sequentially at field frequency 60 [fps]. At the same time, control block 5 data decompressed the read data into an original image data by the image compression/decompression block 11, records the resulted data to the video recording medium 3 with the moving image recording processing block 10 while displaying the image data on the display block 12.

In this slow-motion taking mode, the control block 5 sets a timing at which to end the writing of the image data to the memory 2, with reference to an image pattern detection result obtained in the image recognition processing block 14. To be more specific, on the basis of an image pattern detection result in the image recognition processing block 14, the control block 5 detects a timing at which a predetermined particular pattern is detected in a predetermined sequence and, on the basis of this detected timing, determines a timing for ending the writing of the image data to the memory 2.

Here, in the present embodiment, this particular pattern is an image pattern in which an image recognition subject in the image recognition processing block 14 exists in a particular area of each imaging result; two or more particular image patterns are provided for each taking mode in the slow-motion taking mode.

Figure 7:
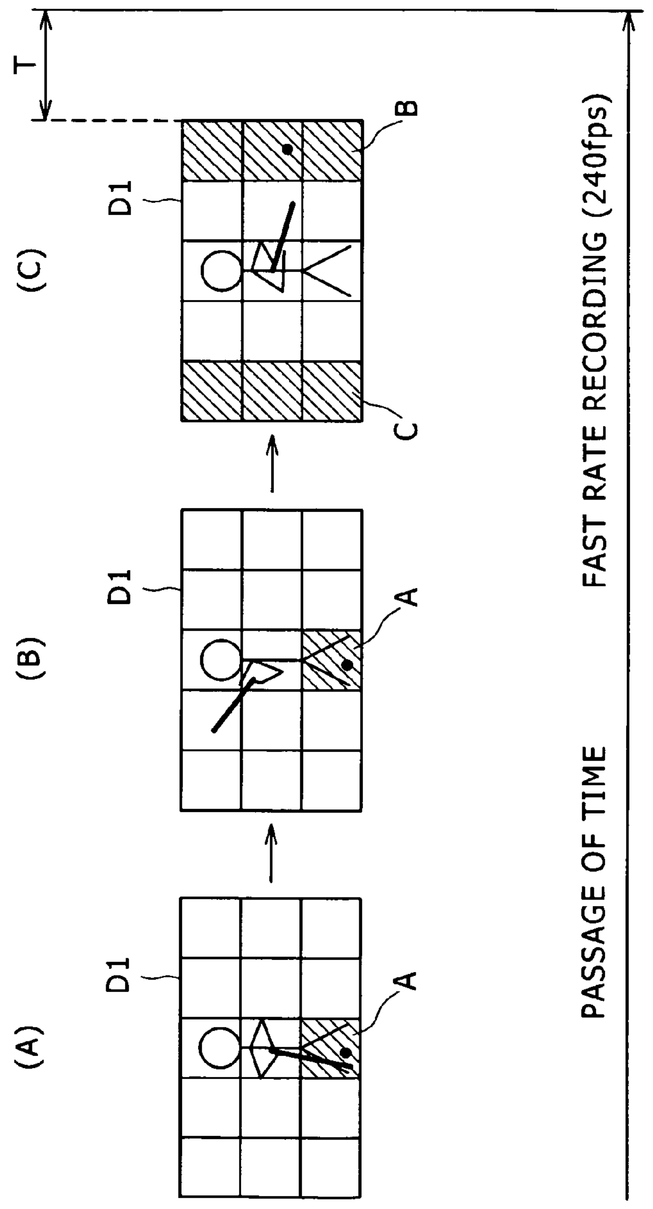
FIG. 7 is a schematic diagram for describing a golf swing mode in the imaging apparatus shown in FIG. 1.

Namely, if the taking mode is the golf swing mode, the image recognition subject in the image recognition processing block 14 is set to a ball; as shown in FIG. 7, in two or more areas formed by dividing a screen of one field horizontally and vertically, patterns (FIGS. 7(A) and (B) in which a ball exists in area A at the bottom in the horizontal direction are set as a first pattern and a second pattern of these particular patterns. A pattern in which a ball exists in area B at the right end or area C at the left end in the horizontal direction is set as a third pattern of these particular patterns. It should be noted that the example shown in FIG. 7 is an example in which the number of divisions in the horizontal direction and the vertical direction of one screen are set to 5 and 3, respectively.

In the example shown in FIG. 7, when the ball is teed up, addressed, and then hit, these first through third patterns are sequentially detected. In this case, the fields from a field in which the third pattern that is a state in which the ball has been hit was detected tracked back to a field by the predetermined number of fields form the fields in which a golf swing was taken, which is determined to be a scene desired by the user.

So, in the golf swing mode, when the user instructs the slow-motion taking mode, the control block 5 instructs the start of writing an imaging result to the memory 2. At the same time, the control block 5 sets a ball to recognition subject and instructs the image recognition processing block 14 to execute image recognition processing, thereby sequentially detecting the first through the third patterns on the basis of an image recognition processing result. When the third pattern is detected, the writing to the memory 2 is ended at a time after predetermined time T to read the imaging result stored in the memory 2 at that moment to be stored in the video recording medium 3. It should be noted that predetermined time T is set by the user in a user setting sequence.

Figure 8:
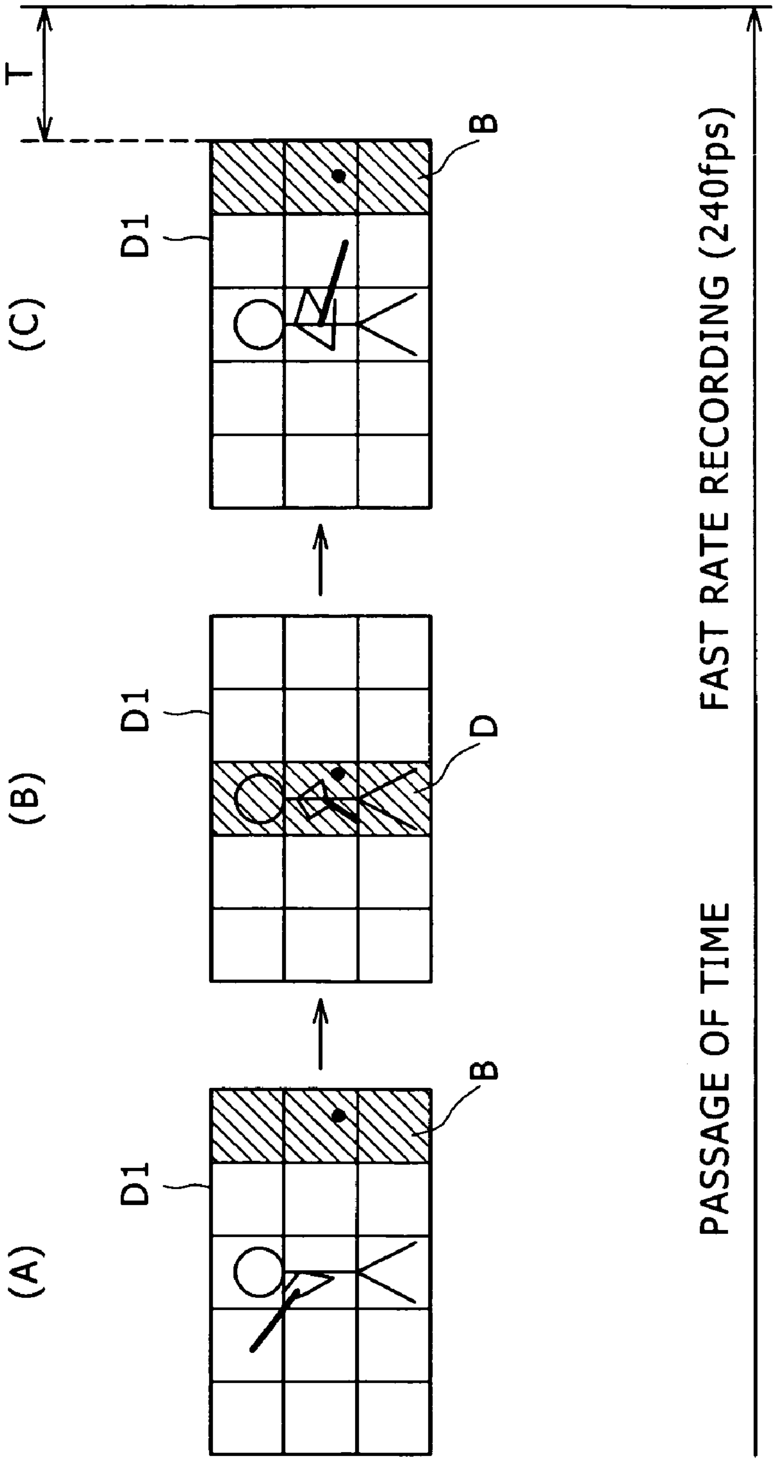
FIG. 8 is a schematic diagram for describing a baseball swing mode in the imaging apparatus shown in FIG. 1.

On the other hand, in the case where the imaging mode is the baseball swing mode, the image recognition subject in the image recognition processing block 14 is set to a ball. As shown in FIG. 8, a pattern (FIG. 8(A)) in which the ball exists in area B at the right end in the horizontal direction is set as the first pattern of these particular patterns. At the same time, patterns (FIGS. 8(B) and (C)) in which the ball exists in central area D and area B at the right end in the horizontal direction are set as the second pattern and the third pattern of these particular patterns.

In the example shown in FIG. 8, the first pattern is detected when the ball pitched by a pitcher has entered the screen, the second pattern is detected when at the moment a batter bats at the ball, and the third pattern is detected at the moment when the ball batted by this batter goes out of the screen. In this case, the fields from the field in which the third pattern was detected to a field traced back by the predetermined number of fields are determined to be a scene desired by the user.

So, also in this baseball swing mode, the control block 5 instructs the start of writing an image result to the memory 2 when the user instructs the slow-motion taking mode. Further, the control block 5 sets a ball as recognition subject and instructs the image recognition processing block 14 to execute image recognition processing, sequentially detecting the first pattern through the third pattern on the basis of an image recognition processing result. When the third pattern is detected, then the control block 5 ends writing to the memory 2 at a time after predetermined time T and reads the imaging result stored in the memory 2 at that moment, storing the imaging result into the video recording medium 3.

In other taking modes, the control block 5 also instructs the start of writing an imagining result to the memory 2 when the slow-motion taking mode is instructed, thereby instructing the image recognition processing block 14 to execute the image recognition processing corresponding to each taking mode. On the basis of an imaging result obtained in the image recognition processing block 14, the control block 5 sequentially detects the first pattern, the second pattern, and the third pattern and, after predetermined time T after the detection of the third pattern, ends the writing to memory 2 to read the imaging result stored in the memory 2 at that moment, thereby storing the imaging result into the video recording medium 3.

Figure 9:
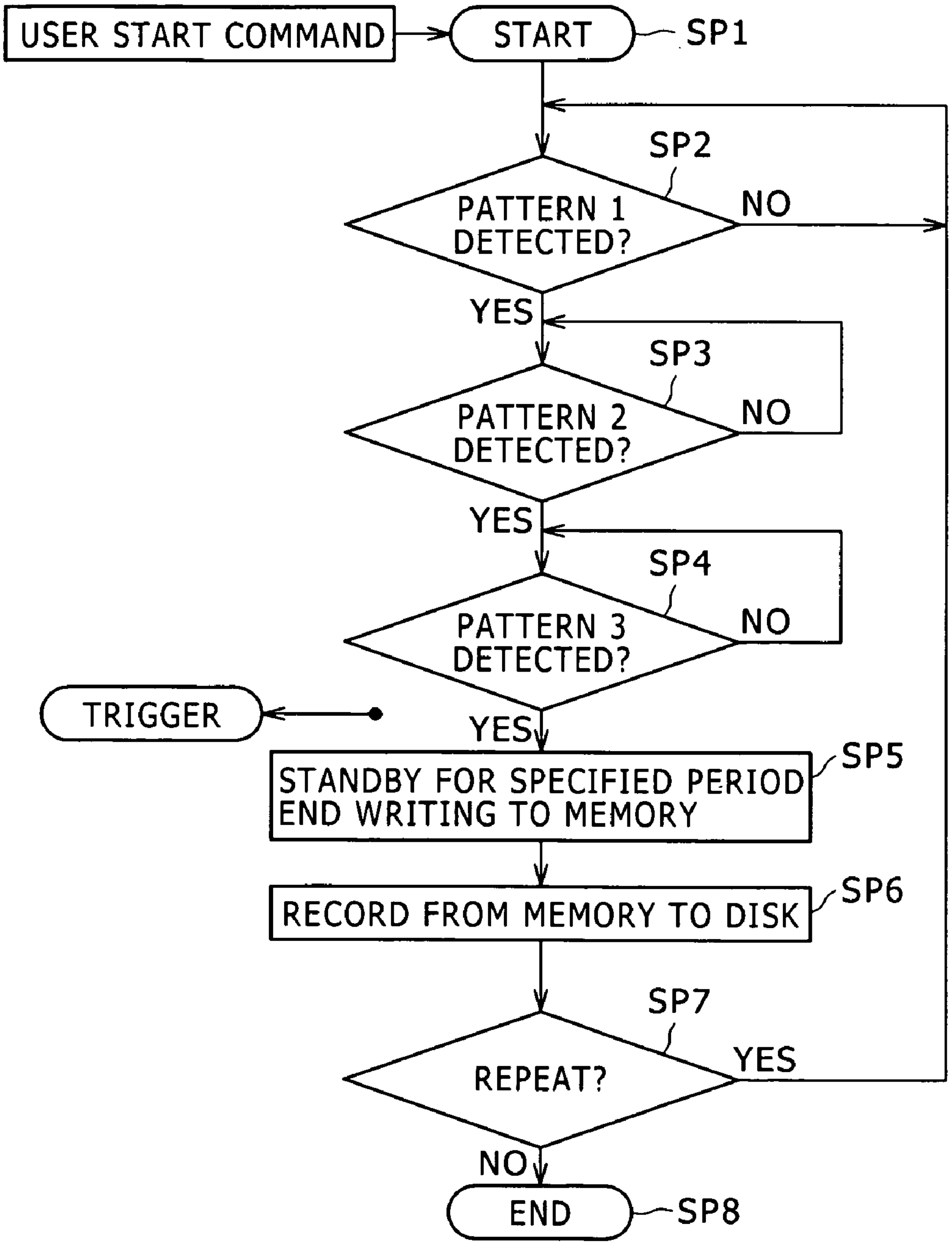
FIG. 9 is a flowchart indicative of a processing procedure associated with the slow-motion taking mode of the imaging apparatus shown in FIG. 1.
Figure 10:
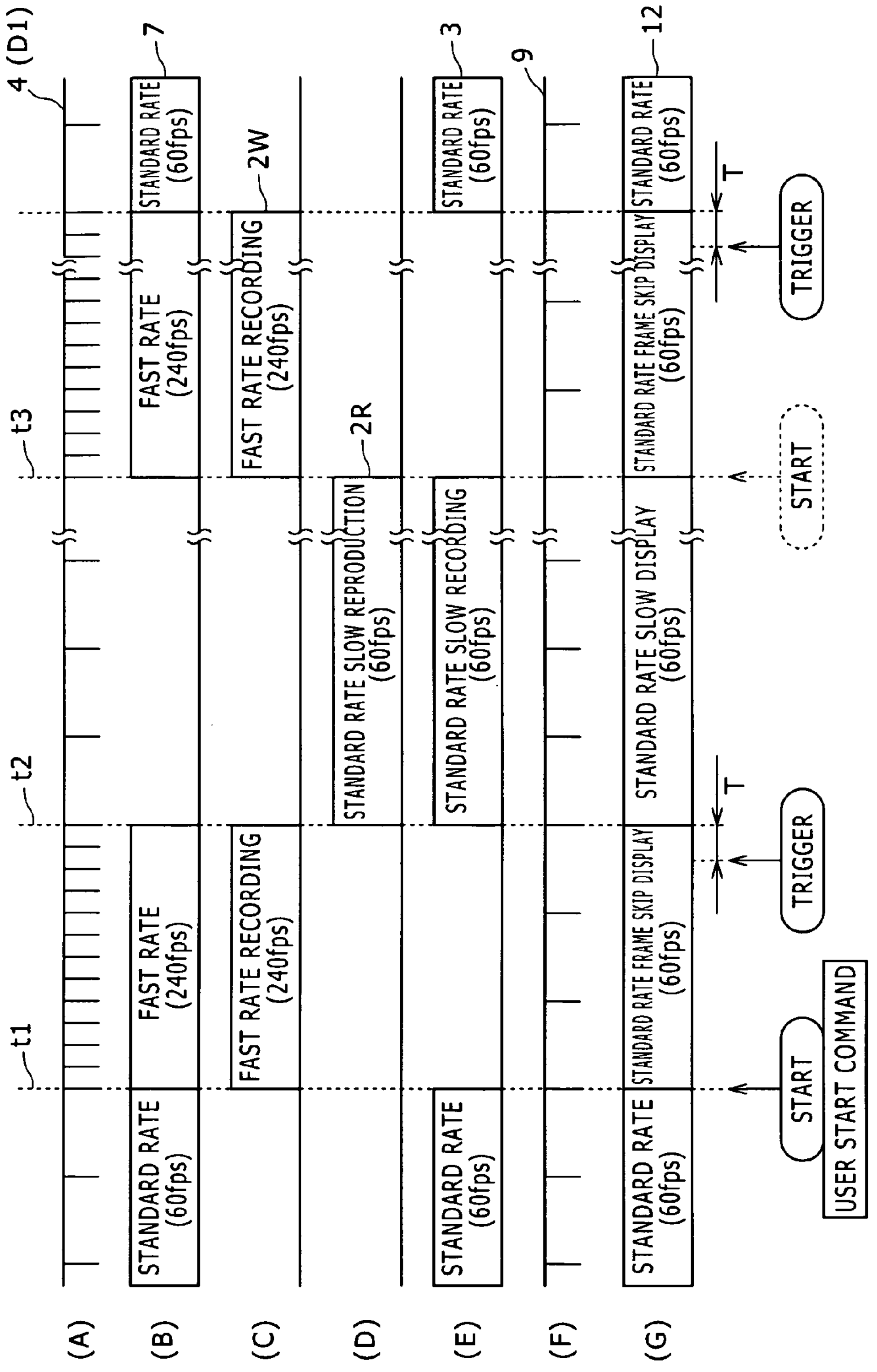
FIG. 10 is a timing chart indicative of an operation of each component of the imaging apparatus shown in FIG. 1.

FIG. 9 is a flowchart indicative of a processing procedure of the control block 5 associated with this slow-motion taking mode and FIG. 10 is a timing chart indicative of an operation of each component block of the imaging apparatus 1 with reference to FIG. 9. It should be noted that in FIG. 10, an operation of each component block having the same reference numeral as that shown in FIG. 1 and 2W and 2R are indicative of a write operation and a read operation on the memory 2, respectively.

In the standard operation mode, the control block 5 controls an operation of the imaging sensor 4 so as to obtain an imaging result at field frequency 60 [fps] (FIG. 10(A)) and, while displaying the imaging result of field frequency 60 [fps] on the display block 12 (FIGS. 10(F) and (G)), records the imaging result to the video recording medium 3 (FIG. 10(E)). It should be noted that, in FIG. 10, a period up to point of time t1 provides an operation period by this standard operation mode.

When the user instructs the start of the slow-motion taking mode in this state, the processing procedure shown in FIG. 9 starts, in which the control block 5 instructs the image recognition processing block 14 to execute the image recognition processing according to the taking mode and, at the same time, instructs each component block to start recording an imaging result of field frequency 240 [fps] to the memory 2. Therefore, in this case, in the imaging apparatus 1, while the image result of field frequency 240 [fps] is obtained from the imaging sensor 4 to be sequentially cyclically stored in the memory 2, an image result of field frequency 60 [fps] obtained by field skipping is provided from the display block 12 (FIGS. 10(A) through (G)).

Setting the operation of each component block as described above, the control block 5 moves from step SP1 to step SP2 to determine on the basis of the image recognition result of the image recognition processing block 14 whether the first pattern has been detected or not. If the determination is negative in step SP2, the control block 5 repeats step SP2 to wait until the first pattern is detected.

When the first pattern has been detected, the control block 5 moves from step SP2 to step SP3 to determine on the basis of a next image recognition result of the image recognition processing block 14 whether the second pattern has been detected or not. If the determination is negative in this step SP3, the control block 5 repeats step SP3 to wait until the second pattern is detected.

When the second pattern is detected, the control block 5 moves from step SP3 to step SP4 to determine on the basis of a next image recognition result of the image recognition processing block 14 whether the third pattern has been detected or not. If the determination is negative in this step SP4, the control block 5 repeats step SP4 and waits until the third pattern is detected.

When the third pattern is detected in step SP4, the control block 5 moves from step SP4 to step SP5 and, after waiting for period T set by the user, ends the writing to memory 2. In step SP6, the imaging result stored in the memory 2 at that moment is read to be stored in the video recording medium 3. It should be noted that, in FIG. 10, a period from point of time t1 to point of time t2 provides a period in which writing to the memory 2 is executed in this slow-motion taking mode and a following period from point of time t2 to point of time t3 provides a period in which reading from the memory 2 is executed.

When the reading of imaging results from the memory 2 has been completed, the control block 5 moves from step SP6 to step SP7 to determine whether the user has instructed the repetition of slow-motion taking or not and, if the determination is affirmative, instructs the start of recording the imaging result of field frequency 240 [fps] to the memory 2, then returning to step SP2. On the other hand, if the user has not instructed the repetition of slow-motion taking, the control block 5 moves from step SP7 to step SP8 to end this processing procedure.

It should be noted that, while an imaging result is being written to the memory 2, the control block 5 turns on a tally lamp and/or displays a predetermined mark on the display block 12, thereby letting the user understand an imaging situation.

(2) Operations of Embodiment 1

In the above-mentioned configuration, when the standard operation mode is set in the imaging apparatus 1 (FIG. 1), an imaging result of field frequency 60 [fps] is obtained in the imaging sensor 4 and this imaging result is processed by the AFE 6, the camera signal processing block 7, the resolution conversion processing block 8, and the display processing block 9 in this order to be displayed on the display block 12. At the same time, image data outputted from the resolution conversion processing block 8 is compressed by the moving image recording processing block 10 to be recorded to the video recording medium 3.

When the operation mode has been switched to the slow-motion taking mode, an imaging result of field frequency 240 [fps] is obtained in the imaging sensor 4 and this imaging result of field frequency 240 [fps] is sequentially cyclically stored in the memory 2 via the AFE 6, the camera signal processing block 7, the image compression/decompression block 11, and the memory control block 13 (FIG. 5).

In the imaging apparatus 1, the storing of this imaging result of field frequency 240 [fps] into the memory 2 ends with a predetermined timing and the imaging result stored in the memory 2 at that point of time is sequentially read at a speed lower than at the writing. The read imaging result is sequentially processed by the image compression/decompression block 11, the resolution conversion processing block 8, and the moving image recording processing block 10 to be recorded to the video recording medium 3 (FIG. 6).

Therefore, in the imaging apparatus 1, the video obtained by slow-motion taking a desired subject by switching the operation mode to the slow-motion taking mode can be recorded to the video recording medium 3.

However, ending the writing of an imaging result to the memory 2 with reference to a point of time at which a control has been operated, for example, may not always correctly take a desired scene because the operation of a control is too fast or too slow. If a sound is used for trigger, an unwanted sound may trigger, thereby also failing the correct taking of a desired scene in this case.

So, in the imaging apparatus 1, if the slow-motion taking mode is set, an image pattern corresponding to the taking mode is detected by the image recognition processing in the image recognition processing block 14 (FIG. 2 through FIG. 4) and this image recognition processing result is analyzed in the control block 5 to determine in which area this image pattern exists. On the basis of a result of this determination, a timing with which a particular pattern is detected in a predetermined sequence for each taking mode. Further, on the basis of the detected timing, the writing of an imaging result to the memory 2 is ended, upon which the reading of the imaging result stored in the memory 2 at that moment starts.

Therefore, in the imaging apparatus 1, if a period of slow-motion taking is set on the basis of a pattern recognition result of an imaging result and a period of slow-motion taking is set with reference to the operation of a control by the user, a scene desired by the user can be taken more surely than setting a period of slow-motion taking with reference to sound.

Further, because the processing of setting a period of slow-motion taking on the basis of this pattern recognition result is executed with reference to the timing with which a particular pattern is detected in a predetermined sequence for each taking mode, the erroneous decision of reference timing can be effectively avoided, thereby allowing the more correct taking of desired scenes.

Namely, in the golf swing mode (FIG. 7) for example, when, following the first pattern in which a ball exists in the bottom area of the center in the horizontal direction, the second pattern in which a ball likewise exists in the bottom area of the center in the horizontal direction is detected and then the third pattern in which a ball exists in the right end area in the horizontal direction is detected, a period of slow-motion taking is set with reference to the timing with which this third pattern was detected.

In this case, if a period of slow-motion taking is set with reference to only the first or second pattern for example, the timing with which the writing of an imaging result to the memory 2 cannot be identified because the first or second pattern is a pattern of relatively long period in which a ball is teed up. If a period of slow-motion taking is set with reference to only the third pattern, the writing of an imaging result to the memory 2 may be ended erroneously if a butterfly for example, other than the ball, appears in the screen, for example.

In the baseball swing mode (FIG. 8), when, following the first pattern in which a ball exists in the right end area in the horizontal direction, the second pattern in which ball likewise exists in the center area in the horizontal direction is detected and then the third pattern in which a ball exists in the right end area in the horizontal direction is detected, a period of slow-motion taking is set with reference to this timing with which the third pattern was detected.

In this case, if a period of slow-motion taking is set with reference to only any one of the first through third patterns for example, slow-motion taken video is recorded to the video recording medium 3 if a batter took a look for example, thereby executing slow-motion taking in waste.

However, as with the present embodiment, ending the writing of an imaging result to the memory 2 with reference to the timing with which these first through third patterns are detected in a predetermined sequence allows the effective avoidance of these wasted and erroneous operations, thereby surely taking a scene desired by the user.

Also, because, in this embodiment, an image recognition subject of the image recognition processing block is an image that exists at a particular position of an imaging result, the configuration in the image recognition processing block can be simplified in the case where two or more kinds of ball games are handled by use of a common pixel difference table, for example, thereby surely taking a scene desired by the user with a simplified configuration.

(3) Effects of Embodiment 1

According to the above-mentioned configuration, ending the high-speed writing of an imaging result to a memory with reference to a timing with which images of a particular pattern are sequentially detected and recording the imaging result written to this memory to a recording medium allows the sure slow-motion taking of desired scenes.

Because, with this particular pattern, an image recognition subject to be detected by the image recognition block is an image that exists at a particular position in one screen, scenes desired by the user can surely be taken with a simple configuration.

(4) Embodiment 2

Figure 11:
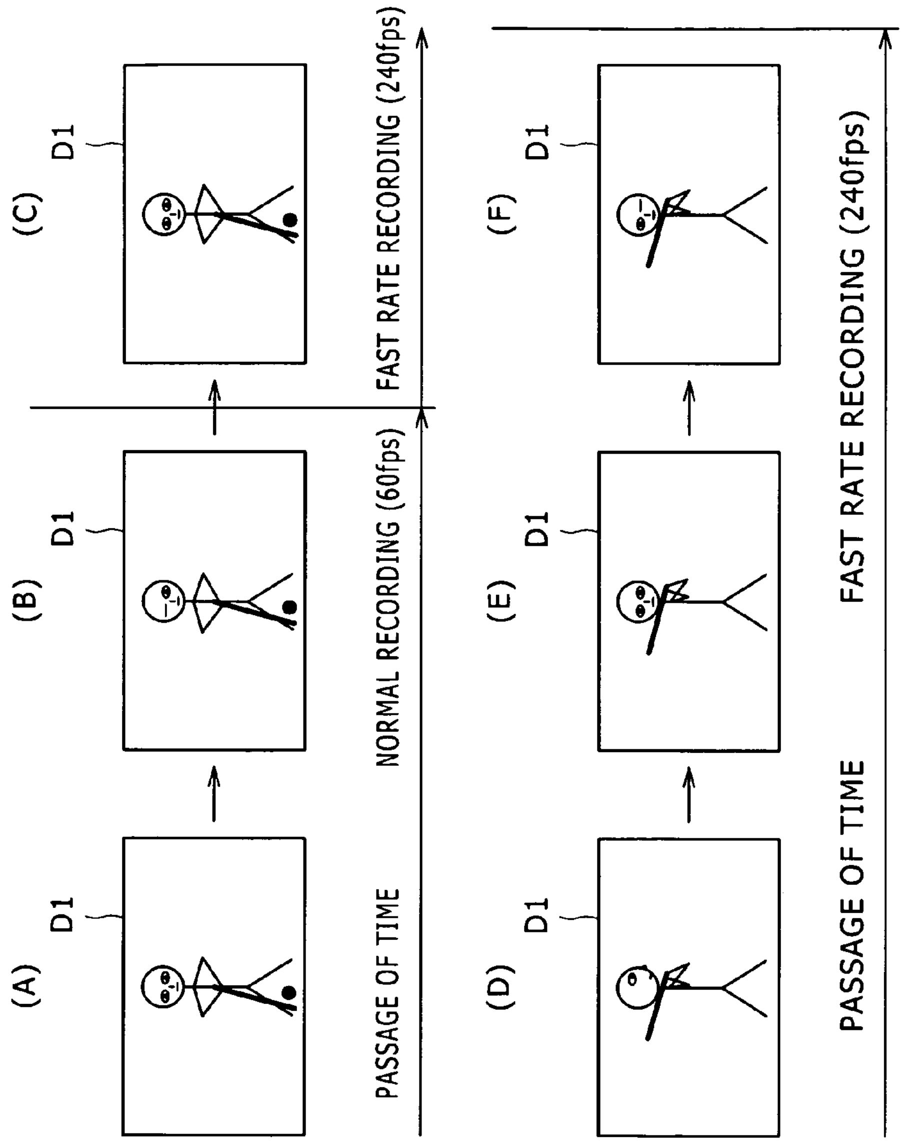
FIG. 11 is a schematic diagram for describing a timing setting operation at the time of slow-motion taking in an imaging apparatus practiced as embodiment 2 of the present invention.

FIG. 11 is a schematic diagram for describing the setting of timing at the time of slow-motion taking in an imaging apparatus practiced as embodiment 2 of the present invention, as compared with FIG. 7 and FIG. 8. The imaging apparatus of this embodiment is configured in substantially the same manner as the imaging apparatus 1 of embodiment 1 except for a timing setting method. Therefore, in what follows, description will be made by appropriately using the configuration shown in FIG. 1.

Like the imaging apparatus 1 of embodiment 1, the imaging apparatus of this embodiment here sets a period of slow-motion taking with reference to a timing with which images of a particular pattern are detected in a predetermined sequence. With the imaging apparatus of this embodiment, a pattern for detecting a cue of a subject of taking to this particular pattern is applied.

To be more specific, in this embodiment, in the golf swing mode, a pattern with both eyes open is set to the first pattern (FIG. 11(A)) and a pattern with the right eye closed is set to a second pattern (FIG. 11(B)). A pattern with both eyes open is set to the third pattern (FIG. 11(C)). The control block 5 sequentially detects these first through third patterns to detect a cue by the winking of the subject of taking. When the third pattern is detected after the closing of the right eye by winking, the control block 5 starts writing an imaging result to the memory 2 from the point of time at which this third pattern was detected.

A pattern indicative of a side face looking at the flying ball is set to the fourth pattern (FIG. 11(D)) and a pattern indicative of a front face is set to the fifth pattern (FIG. 11(E)). Further, a pattern with the left eye closed is set to the sixth pattern (FIG. 11(F)). The control block 5 sequentially detects these fourth through sixth patterns to detect a cue by the winking by a subject of taking. Namely, in this case, when a person subject to taking closes his left eye by winking, the sixth pattern is detected and the control block 5 stops the writing to the memory 2 by slow-motion taking from the point of time at which this sixth pattern was detected, starting the reading from the memory 2.

Therefore, in this embodiment, the image recognition processing block 14 records and holds the open-eye pattern and the closed-eye pattern in a pixel difference table and detects these open-eye pattern and closed-eye pattern under the direction of the control block 5 to transmit these open-eye pattern and closed-eye pattern to the control block 5.

According to this embodiment, a period of slow-motion taking is set with reference to a timing at which images of a particular pattern are detected in a particular sequence and the particular pattern detected in this predetermined sequence is a pattern for detecting a cue of a subject of taking, which more surely allows the taking of a scene desired by the user by executing slow-motion taking so as to reflect the intention of the subject of taking.

(5) Embodiment 3

Figure 12:
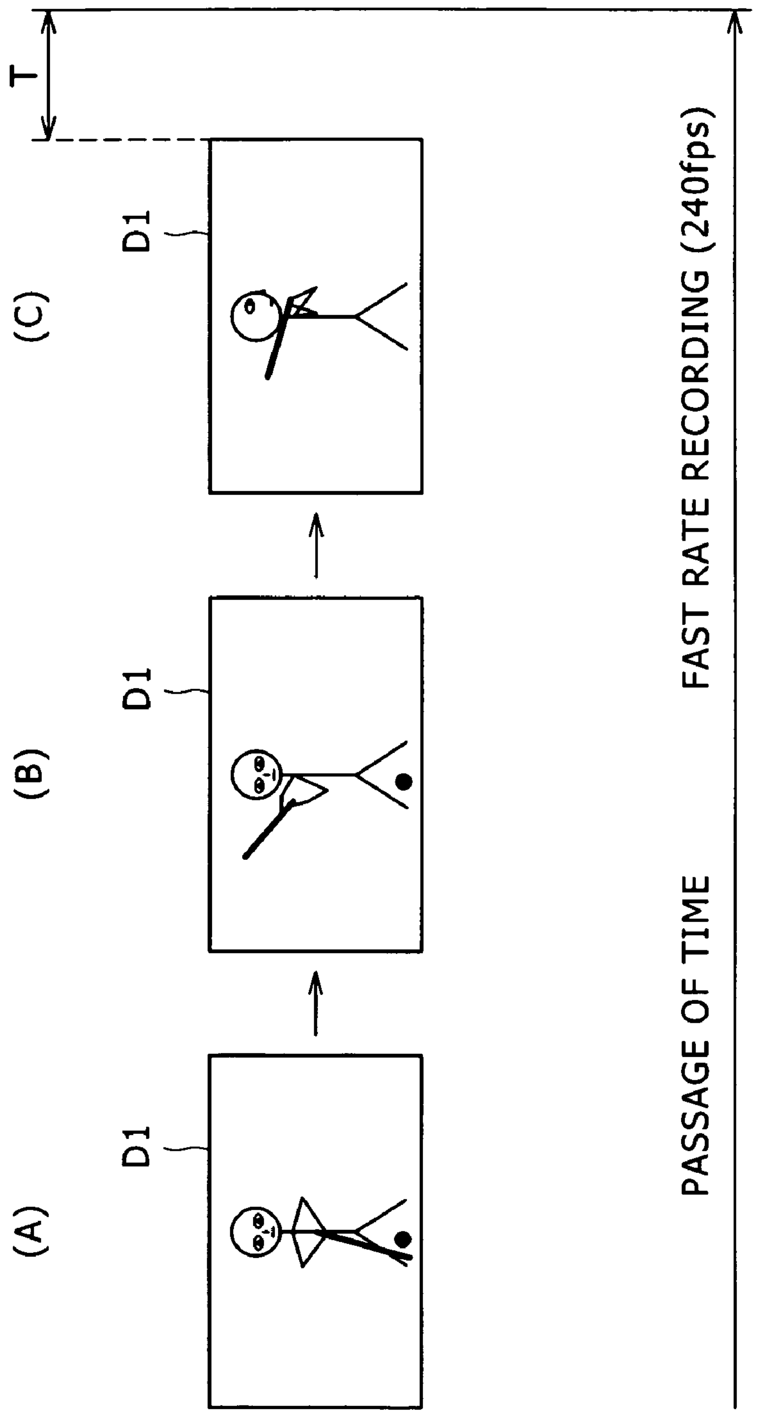
FIG. 12 is a schematic diagram for describing a timing setting operation at the time of slow-motion taking in an imaging apparatus practiced as embodiment 3 of the present invention.

FIG. 12 is a schematic diagram for describing the timing setting at the time of slow-motion taking in an imaging apparatus practiced as embodiment 3 of the present invention, as compared with FIG. 7 and FIG. 8. The imaging apparatus of this embodiment is configured in substantially the same manner as the imaging apparatus of the above-mentioned embodiment except for a timing setting method. Therefore, in what follows, description will be made by appropriately using the configuration shown in FIG. 1.

In this embodiment, like the imaging apparatus 1 of embodiment 1, the imaging apparatus of this embodiment here sets a period of slow-motion taking with reference to a timing with which images of a particular pattern are detected in a predetermined sequence. With the imaging apparatus of this embodiment, a pattern of person's poses detected by a sequence of operations is applied to this particular pattern. Therefore, the imaging apparatus of this embodiment sets a period of slow-motion taking with reference to the change of poses of a subject of taking.

Namely, with this embodiment, as shown in FIG. 12, in the golf swing mode, a pose of addressing in which a person stands still holding a golf club is set to the first pattern (FIG. 12(A)) and a take-back pose is set to the second pattern (FIG. 12(B)). Further, a pose in which the person is looking at a hit ball is set to the third pattern (FIG. 12(C)). Therefore, in this embodiment, the image recognition processing block 14 generates a dictionary such that these first through third patterns are detectable.

When the user instructs slow-motion taking, the control block 5 starts high-speed writing to the memory 2. Also, the control block 5 instructs the image recognition processing block 14 to start image recognition processing and sequentially detects the first through third patterns on the basis of an image recognition processing result. When a predetermined period T has passed after the detection of the third pattern, the writing to the memory is ended and the reading of imaging result stored in the memory 2 at that time is started.

According to this embodiment, a period of slow-motion taking is set with reference to the timing at which images of a particular pattern are detected in a particular sequence and the particular pattern detected in this predetermined sequence is a pose to be detected by a sequence of operations, thereby allowing more accurate taking of a scene desired by the user by accurately determining a subject of taking accompanying a particular pose, such as taking a golf swing for example.

(6) Embodiment 4

An imaging apparatus of this embodiment sets a period of slow-motion taking with reference to a timing at which images of a particular pattern are detected in a particular sequence and accepts the setting of this particular pattern by operation done by the user. The imaging apparatus of this embodiment is configured in substantially the same manner as the imaging apparatus of each of the above-mentioned embodiments except for this particular pattern setting. Therefore, in what follows, the configuration of the imaging apparatus of embodiment 4 will be described by appropriately using the configuration of the imaging apparatus of embodiment 1.

Namely, with this imaging apparatus, when the user selects the registration mode of slow-motion taking, the control block 5 displays a guide message on the display block 12 and/or synthesizes and outputs guide sound, thereby prompting the user for a sequence of operations to be executed in the registration mode by these display and/or sound.

Figure 13:
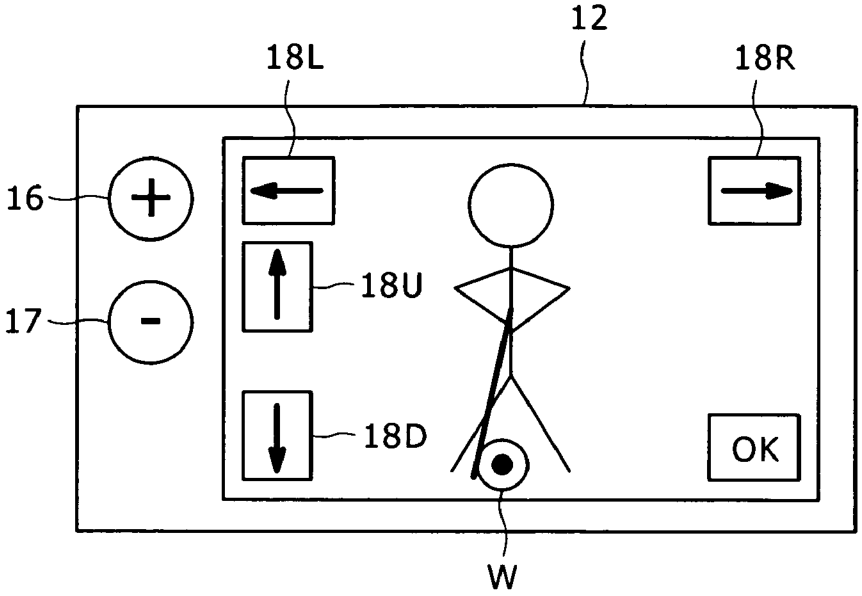
FIG. 13 is a top view illustrating a display screen at the time of pattern setting in an imaging apparatus practiced as embodiment 4 of the present invention.

The control block 5, on the basis of the operation by the user in accordance with these guides, takes a subject of slow-motion taking on a trial basis in the standard operation mode and records the trial taking to the video recording medium 3. The control block 5 also reproduces the moving image taken on a trial basis and displays the reproduced moving image on the display block 12. In the reproduction of this moving image, the control block 5 instructs the user to execute a pause and, as shown in FIG. 13, lets the user select one scene of the subject of slow-motion taking, displaying the selected scene on the display block 12.

In this state, the control block 5 accepts the selection of the subject of image recognition in the image recognition processing block 14. Namely, the control block 5 accepts the selection of frame W enclosing the subject of image recognition by displaying a predetermined menu screen and displays this frame W on a still image displayed on the display block 12. Also, in response to operations of up, down controls 16, 17 arranged on a side of the display screen, the control block 5 zooms in, out the display of this frame W. The control block 5 displays menus 18U, 18D, 18R and 18L for specifying movement in up/down directions and left/right directions onto the display screen and, in response to operations of these menus 18U, 18D, 18R and 18L detected through a touch panel moves the display position of frame W up/down and left/right. When the user operates an OK menu, the control block 5 sets an image enclosed by frame W to the subject of recognition of the image recognition processing block 14.

Namely, in this case, after transferring the image data of this still image to the image recognition processing block 14 for preprocessing, the control block 5 detects the coordinate values of two points to be registered in a pixel search table from the portion enclosed by frame W with reference to a feature point detected by this preprocessing. Also, the control block 5 calculates a threshold value by calculating a pixel difference value of these two points and registers the obtained coordinate values and the threshold value of these two points into the memory 14D. It should be noted that, in this case, as described above, if a particular image pattern is detected by combination with the color detection processing based on color information for example, the processing is executed by various combinations of two or more other detection processing operations, or genetic algorithms are used, for example, the control block 5 obtains information necessary for the execution of each processing operation to build a dictionary in the memory 14D.

For example, the registration of a subject of detection may be accepted by merely accepting the setting of frame W without executing the processing of trial taking. In this case, after accepting the setting of frame W by the user, the control block 5 instructs the image recognition processing block 14 to execute the processing of setting an image enclosed by the set frame W as the subject of recognition. Instructed by the control block control block 5, the image recognition processing block 14 registers the subject of search into the pixel search table from the image enclosed by frame W at the time of starting slow-motion taking, subsequently searching for a subject of recognition by use of this pixel search table.

Figure 14:
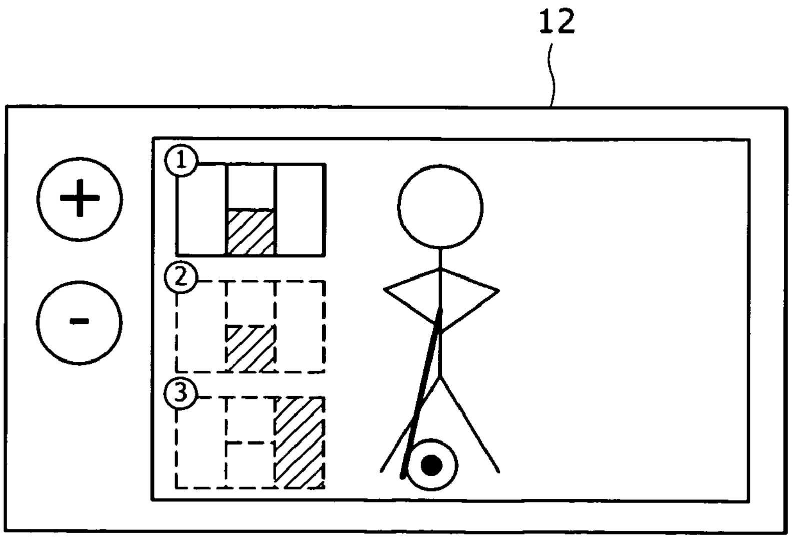
FIG. 14 is a top view continued from FIG. 13.

After registering the dictionary into the memory 14D, the control block 5 accepts the setting of the first through third patterns. Here, as shown in FIG. 14, the control block 5 switches the displays on the display block 12 and displays the boundary of an area for determining presence or absence of an image recognition subject for each pattern. In displaying for each pattern, the control block 5 accepts the selection of an area by the user. It should be noted that the first through third patterns shown in FIG. 14 are an example in which one screen is horizontally divided into three areas and the center area is divided vertically, these areas being set. The control block 5 detects the selection of each area by the user through the touch panel and switches the display colors of the area selected by the user, notifying the user thereof. It should be noted that, in FIG. 14, the area selected by the user is shown by hatching.

therefore, in the examples shown in FIG. 13 and FIG. 14, the case where a ball exists in the lower center area in the horizontal direction is assigned to the first and second patterns and the case where a ball exists in the right-side area in the horizontal direction is assigned to the third pattern.

It should be noted that, instead of accepting the selection of an area by the user by displaying the areas of these first through third patterns, the direct specification of an area by the user on the display screen may be accepted. It is also practicable to reproduce video taken on a trial basis and accept a pause operation with a scene corresponding to each pattern, thereby accepting the registration of each pattern by processing this paused image. Namely, in this case, with the paused image, a position in which the subject of recognition exists is detected and an area in which the subject of recognition exists in each pattern is detected on the basis of this detection result. Further, it is practicable to display a predetermined moving pattern set beforehand and let the user select this moving pattern, thereby accepting pattern registration. In addition, it is practicable to prepare preset parameters, such as the golf mode and the tennis mode, for example, as simple setting modes and accept the change of these parameters, thereby accepting pattern registration.

It should be noted that, as described above with respect to embodiment 3, in the case where a timing is detected by a pattern by pose, video taken on a trial basis may be reproduced to accept a pause operation and this paused image may be analyzed to accept pattern registration for each pose.

When each pattern area has been selected by the user, the control block 5 ends the registration mode in response to the operation of a predetermined control, thereby ending the acceptance of particular pattern setting.

When the slow-motion taking is specified again, the control block 5 ends the writing of an imaging result to the memory 2 with reference to a timing with which the first through third patterns registered in the registration mode are sequentially detected as with the case of embodiment 1.

Figure 15:
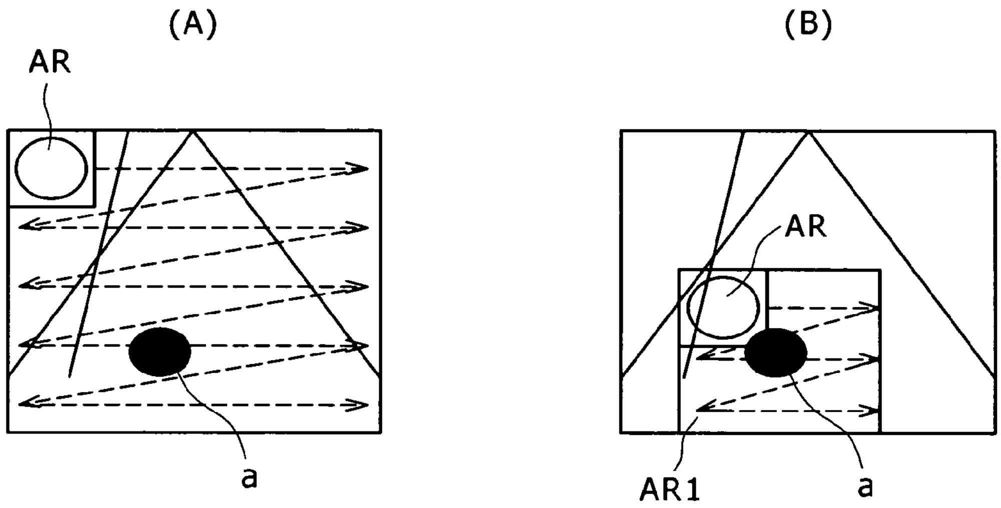
FIGS. 15(A) and 15(B) are schematic diagrams for describing image recognition processing in the imaging apparatus practiced as embodiment 4 of the present invention.

In this embodiment, when detecting the first and second patterns, the control block 5 further instructs the image recognition processing block 14 to execute image recognition processing in only the lower center area in the horizontal direction in which the subject of recognition exists in these first and second patterns. After the detection of the second pattern, the control block 5 instructs the image recognition processing block 14 to execute image recognition processing only in the right-side area in the horizontal direction in which the subject of recognition exists in the third pattern. In response to the instruction of the control block 5, the image recognition processing block 14 scans a pattern matching area to detect an image in which a ball that is the subject of recognition exists, thereby omitting detected-image scaling processing that is one of preprocessing operations necessary for the image detection processing based on pattern matching. Also, the pattern matching scan in the entire screen is omitted to simplify the processing by executing the scan processing in only a partial area. It should be noted that FIG. 15(A) shows the case in which the subject of recognition is detected only in the lower center area in the horizontal direction as described above with reference to FIG. 13, indicating pattern matching area scan by an arrow.

The image recognition processing block 14 narrows the size of the area to be pattern-matched with reference to the result of image recognition immediately before and executes image recognition processing at high speeds. Namely, the image recognition processing block 14 detects image recognition subject a by executing raster scan on pattern matching area AR in the entire area instructed for image recognition processing in the first one field as shown in FIG. 15(A) in the image recognition processing in each area. In the second and subsequent fields, image recognition subject a is detected by executing raster scan on pattern matching area AR in constant range AR1 around the position of image recognition subject a detected in the immediately preceding field as shown in FIG. 15(B).

Figure 16:
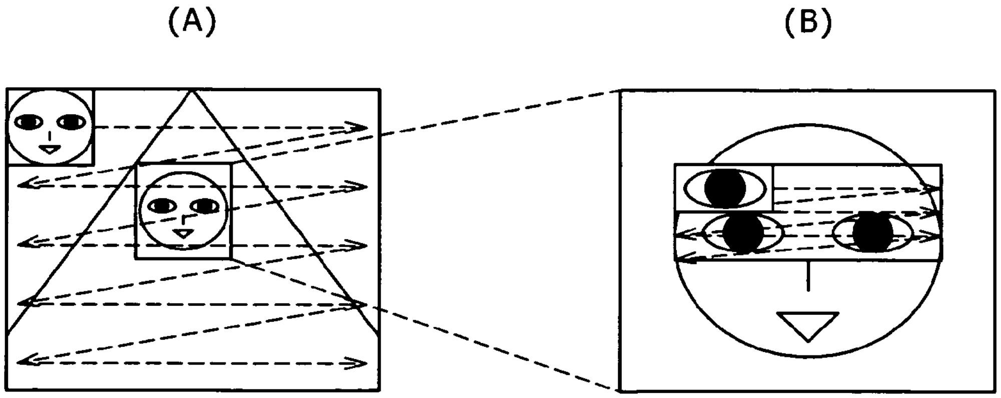
FIGS. 16(A) and 16(B) are top views continued from FIG. 15.

It should be noted that, as described with respect to embodiment 2, in the case of detection of eye opening or closing, the position of a face is first identified by use of a dictionary (a pixel difference table) associated with face as shown in FIG. 16(A), then a range supposed to have eyes is set from the identified face position, and the open eye or the closed eye is detected by searching this set range by use of the dictionary associated with eye as shown in FIG. 16(B), which allows the narrowing of the size of each area to be pattern matched with reference to the immediately preceding image recognition result, thereby executing the image recognition processing at high speeds. Further, in this case, the precision of the image recognition processing can be enhanced.

According to this embodiment, a period of slow-motion taking is set with reference to a timing with which images of a particular pattern are detected in a particular sequence and the registration of this particular pattern is accepted by a user operation to apply this particular pattern to the taking of various subjects, thereby surely taking a user-desired scene in a slow motion manner.

(7) Embodiment 5

Figure 17:
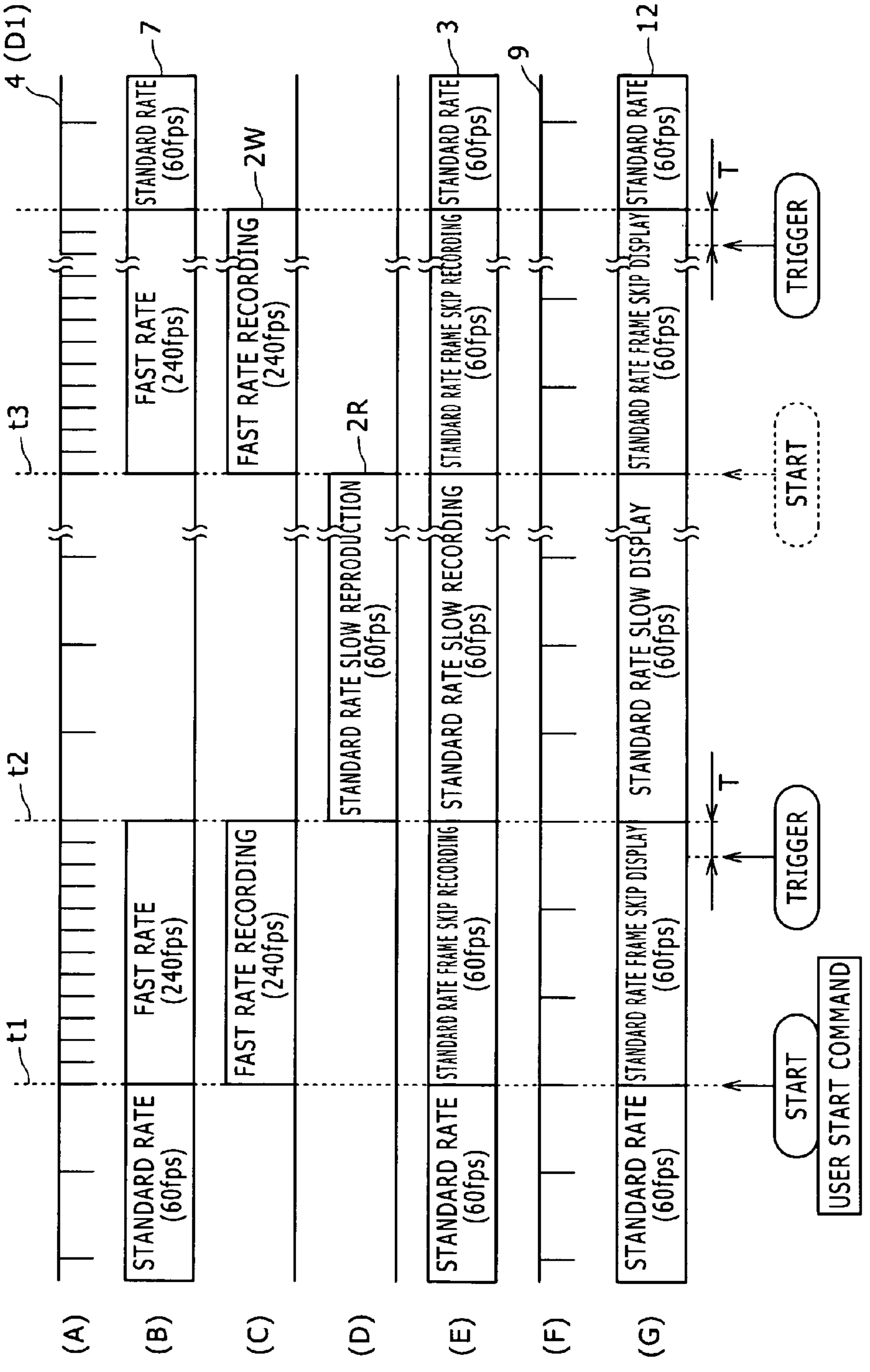
FIG. 17 is a timing chart for describing an operation of an imaging apparatus practiced as embodiment 5 of the present invention.

FIG. 17 is a timing chart for describing operations of an imaging apparatus practiced as embodiment 5 of the present invention, as compared with FIG. 10. In the imaging apparatus of this embodiment, even in a period in which an imaging result recorded to a memory at high speeds is recorded in the slow-motion taking mode, field-skipped image data is recorded to a recording medium. The imaging apparatus of this embodiment is configured in substantially the same manner as the imaging apparatus of each of the above-mentioned embodiments except for this recording to a recording medium. Therefore, in what follows, the configuration of the imaging apparatus of this embodiment will be described by appropriately using the configuration shown in FIG. 1.

Namely, in this embodiment, the resolution conversion processing block 8 outputs image data D1 processed by the camera signal processing block 7 to the moving image recording processing block 10 for recording and converts the resolution to output the converted image data to the display block 12, in the standard operation mode as described above with respect to embodiment 1.

In contrast, in the slow-motion taking mode, in recording to the memory 2, while image data D1 having field frequency 240 [fps] is field-skipped to be outputted to the display block 12 for monitoring, image data D1 having field frequency 240 [fps] is outputted to the image compression/decompression block 11 for recording to the memory 2 and field-skipped image data D1 having field frequency 60 [fps] is outputted to the moving image recording processing block 10 for recording. In contrast, at the time of reading from the memory 2, as described above with respect to the embodiment 1, image data having field frequency 60 [fps] outputted from the image compression/decompression block 11 is outputted to the moving image recording processing block 10 and the resolution is converted to output the converted image data to the display block 12 for monitoring.

Therefore, in the embodiment, an imaging result having field frequency 60 [fps] can be recorded without interruption and an imaging result with only a desired scene taken in slow motion can be automatically recorded.

According to this embodiment, a period in which slow-motion taking is executed with reference to a timing with which images of a particular pattern are detected in a particular sequence can be set to record an imaging result having field frequency 60 [fps] without interruption, thereby taking only a desired scene in slow-motion.

(8) Embodiment 6

Figure 18:
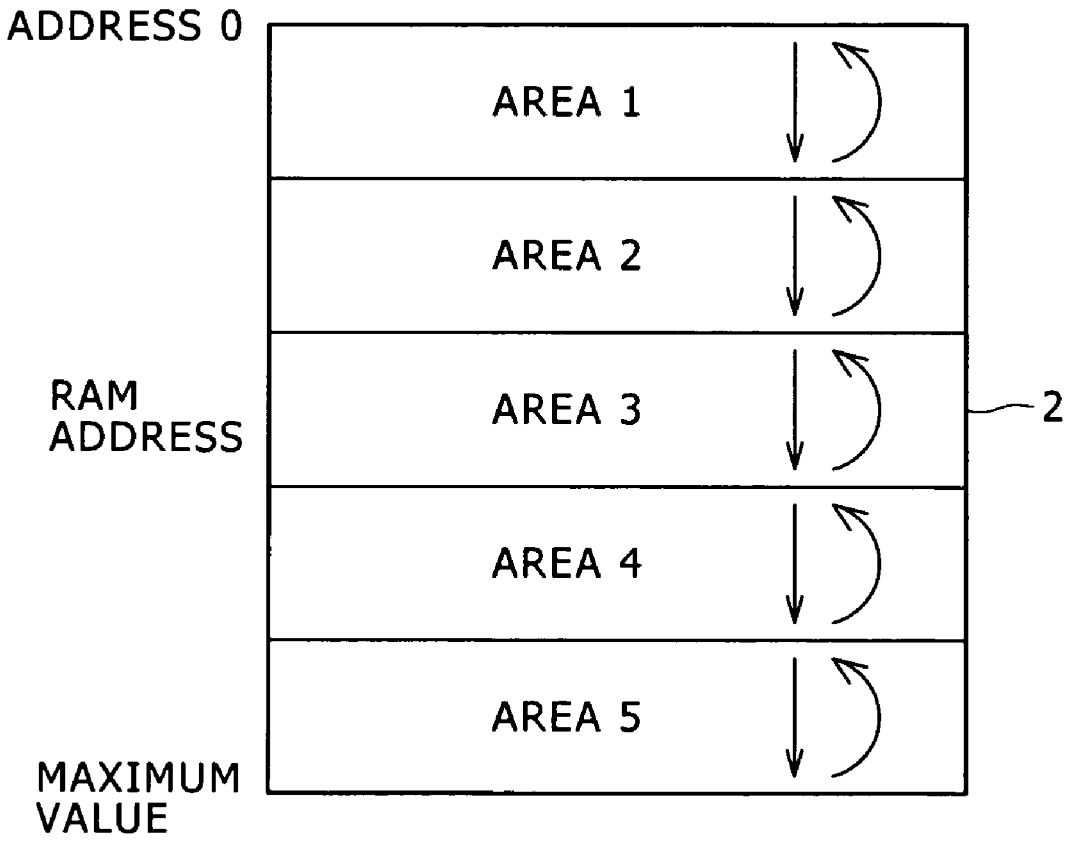
FIG. 18 is a schematic diagram illustrating a configuration of a memory in an imaging apparatus practiced as embodiment 6 of the present invention.

FIG. 18 is a schematic diagram indicative of a configuration of the memory 2 applicable to an imaging apparatus practiced as embodiment 6 of this invention. The imaging apparatus of this embodiment is configured in substantially the same manner as the imaging apparatus of each of the above-mentioned embodiments except for the memory 2. Therefore, in what follows, the configuration of the imaging apparatus of this embodiment will be described by appropriately using the configuration shown in FIG. 1.

Here, with the memory 2 in this embodiment, a recordable area is divided into two or more areas, area 1 through area 5. With this imaging apparatus, these areas 1 through 5 are sequentially cyclically assigned to continuous slow-motion taking to store an imaging result, thereby allowing repeated slow-motion taking. It should be noted that, in FIG. 18, the cyclic writing of an imaging result in each area is indicated by an arrow.

Figure 19:
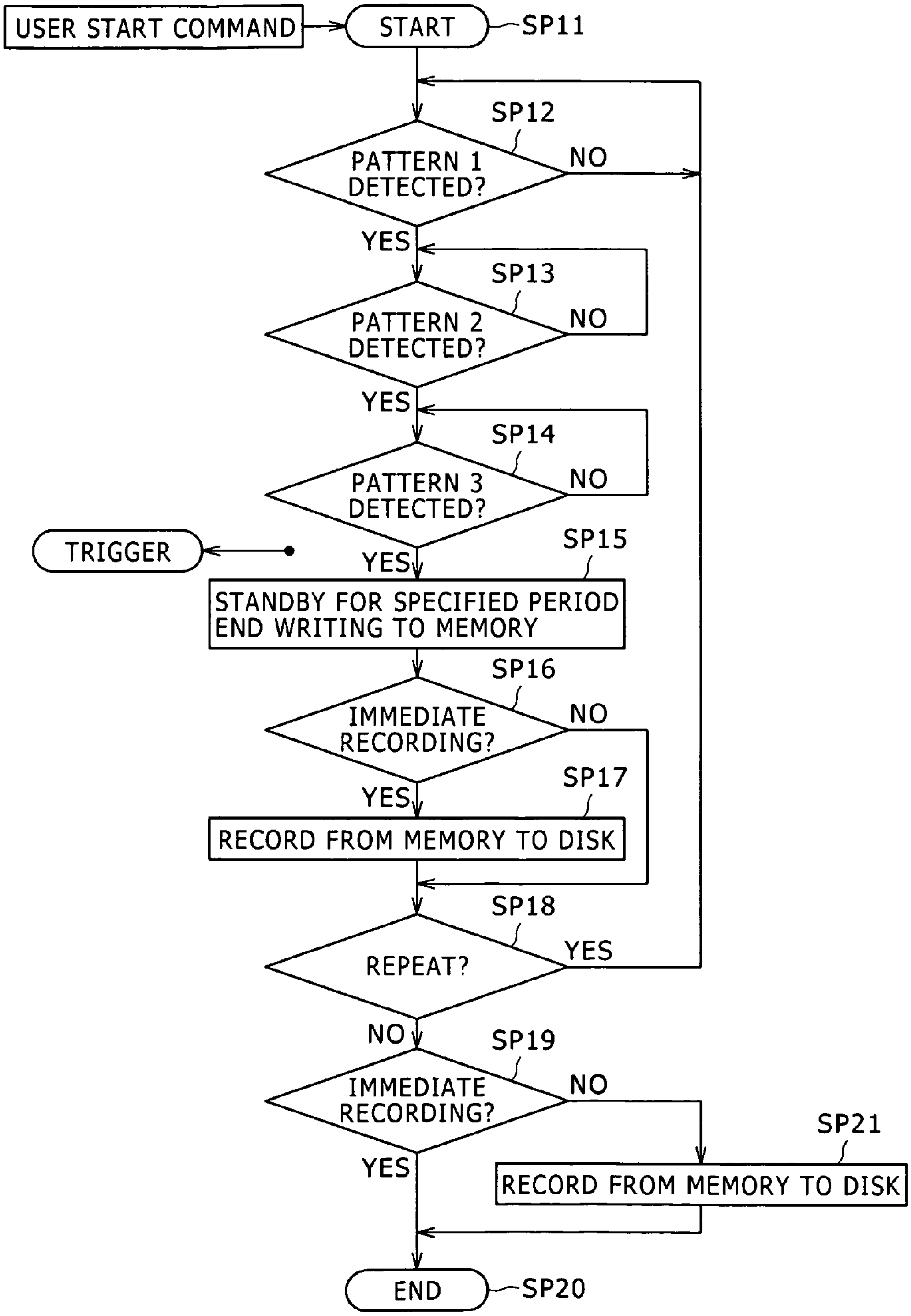
FIG. 19 is a flowchart indicative of a processing procedure of the imaging apparatus practiced as embodiment 6 of the present invention.
Figure 20:
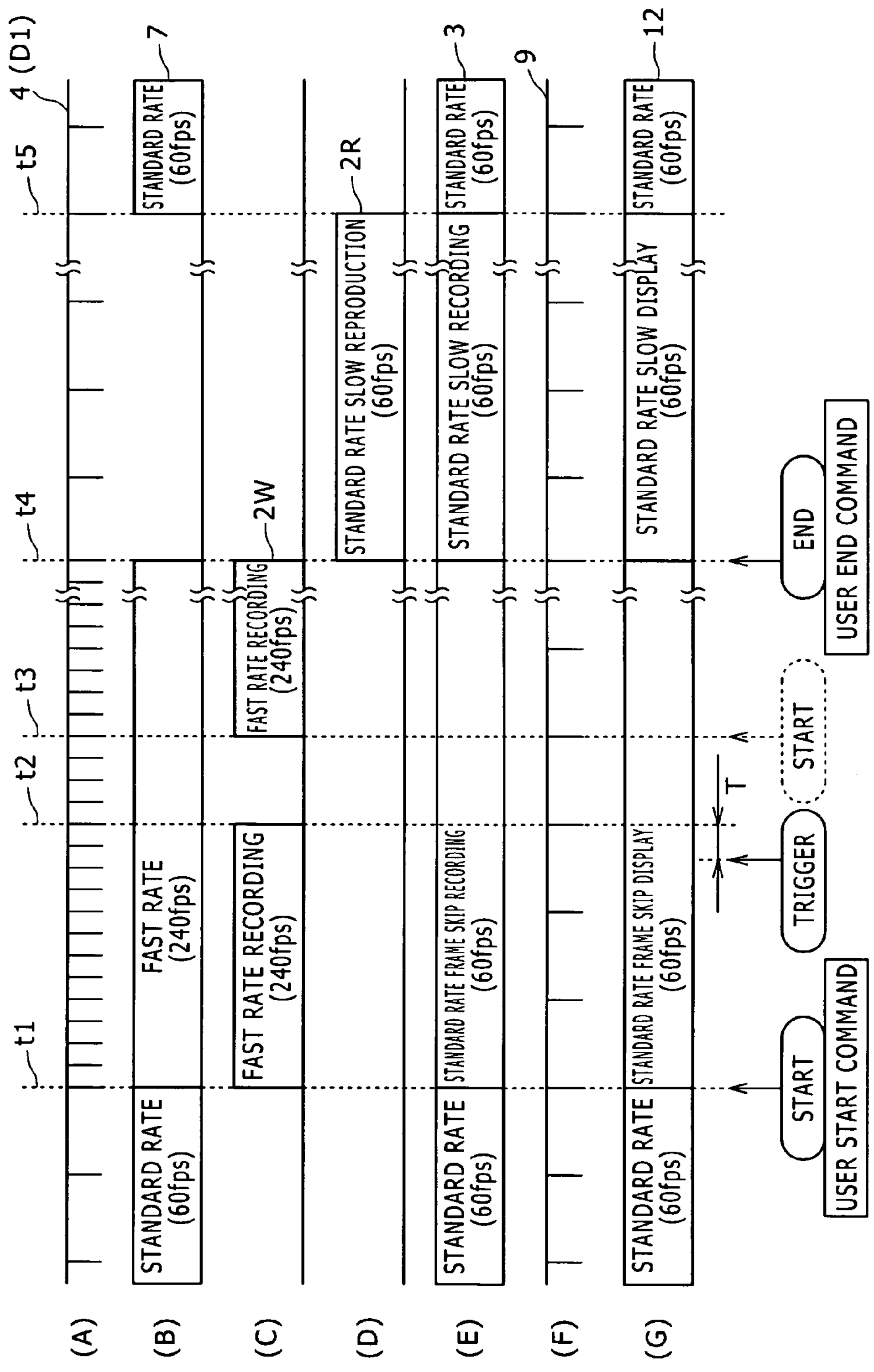
FIG. 20 is a timing chart for describing an imaging apparatus operation in the processing procedure shown in FIG. 19.

FIG. 19 is a flowchart indicative of a processing procedure of the control block 5 of this imaging apparatus, as compared with FIG. 9. FIG. 20 is a timing chart indicative of an operation of each component block of the imaging apparatus, as compared with FIG. 17, in the case where instant recording is not selected by the user in the processing procedure shown in FIG. 19.

When the user instructs the starting of the slow-motion taking mode, the control block 5 starts the processing procedure shown in FIG. 19 and instructs the image recognition processing block 14 to execute the imaging recognition processing corresponding to the taking mode and instructs each component block to start recording an imaging result having field frequency 240 [fps] to the memory 2. Then, the processing procedure goes from step SP11 to step SP12, in which the control block 5 determines on the basis of an image recognition result obtained in the image recognition processing block 14 whether the first pattern has been detected or not. If a negative result is obtained in step SP12, the control block 5 repeats step SP12 to wait until the first pattern is detected.

If the first pattern has been detected, the control block 5 moves from step SP12 to step SP13 to wait until the second pattern is detected and, when the second pattern is detected, moves from step SP13 to step SP14. In step SP14, the control block 5 waits until the third pattern is detected and, if the third pattern is detected, moves from step SP14 to step SP15.

Here, after waiting for the passing of period T set by the user, the control block 5 ends the writing to the memory 2. In step SP16, the control block 5 determines whether the instant recording is selected by the user and, if the result is affirmative, moves from step SP16 to step SP17. Here, the control block 5 reads the imaging result stored in the memory 2 at that point of time and stores the imaging result into the video recording medium 3. It should be noted that, in FIG. 20, a period from point of time t1 to point of time t2 is a period in which writing to the memory 2 is executed in this slow-motion taking mode and a next period from point of time t2 to point of time t3 is a period in which reading from the memory 2 is executed.

When the reading from the memory 2 has been ended, the control block 5 moves from step SP17 to step SP18 to determine whether the user has instructed the repetition of slow-motion taking and, if the result is affirmative, instructs the start of recording to the memory 2, then returning to step SP12. In contrast, if the user has not instructed the repetition of slow-motion taking, the control block 5 moves from step SP18 to step SP19 to determine whether instant recording is selected by the user and, if the result is affirmative, moves from step SP19 to step SP20 to end this processing procedure because, in this case, the processing of recording the imaging result stored in the memory 2 so far has been completed.

Therefore, if instant recording is selected by the user, the imaging apparatus of this embodiment executes the processing of slow-motion taking in the same manner as the above-mentioned embodiment.

In contrast, if instant recording is not selected by the user, the result is negative in step SP16, so that the control block 5 moves from step SP16 to step SP18 without executing the reading from the memory 2 to determine whether the user has instructed the repetition of slow-motion taking and, if the result is affirmative, instructs the start of recording of an imaging result having field frequency 240 [fps] to the memory 2, returning to step SP12. At the same time, the control block 5 instructs the memory control block 13 to operation switching so as to record the imaging result to a next area for the area of the memory 2 to which the imaging result has been recorded until just before.

Therefore, in this case, in the imaging apparatus of this embodiment, area 1 through area 5 are sequentially selected until the user stops the instruction of the repetition of slow-motion taking, the imaging result being stored in the memory 2 at high speeds. At this moment, the imaging result is stored in the next area by omitting the processing of reading the imaging result stored in the memory 2.

If the image result is stored in the memory 2 sequentially as described and the user stops the instruction of the repetition of slow-motion taking or the user has not instructed the repetition of slow-motion taking, the control block 5 moves from step SP18 to step SP19 to determine whether instant recording is selected by the user; in this case the result is negative. In this case, the control block 5 moves from step SP19 to step SP21 and stores reads the imaging result stored in each area of the memory 2 so far to record the image result to the video recording medium 3, moving to step SP20 to end this processing procedure.

Therefore, in this example, the imaging results stored in the memory 2 at high speeds are collectively read at the last to be stored in the video recording medium 3, a period from point of time t4 to point of time t5 shown in FIG. 20 being equivalent to the period in which this processing is executed.

According to this embodiment, a memory is divided into two or more areas and each of these areas is sequentially set to a recording area for an imaging result of slow-motion taking, thereby allowing continuous slow-motion taking to enhance the ease of use for the user.

(9) Other Embodiments

It should be noted that, in the above-mentioned embodiment, the case has been described in which the timing with which the end of writing to the memory 2 by use of three patterns is set but this invention is not limited to this configuration; if the time with which the end of writing can be surely set, the timing with which the writing to the memory 2 is ended may be set by use of two patterns or the timing with which the writing to the memory 2 is ended may be set by use of four or more patterns.

In embodiment 6 mentioned above, if instant recording is not selected by the user, operation switching is executed and the imaging results stored in the memory 2 at high speeds are collectively read at the last to be stored in the video recording medium 3 but this invention is not limited to this configuration; like the case where the timing with which the writing to the memory 2 is ended is set, the instruction of operation switching may be detected. In this case, the user can switch operations of this imaging apparatus at a location away from the imaging apparatus, thereby further enhancing the ease of use for the user. It should be noted that, in this case, it may be necessary to notify the user of the operation switching by means of the flashing of a tally lamp for example, thereby preventing the switching instruction of an erroneous operation.

Also, in the above-mentioned embodiments, if an imaging result stored in a memory is stored in a video recording medium, the imaging result to be the video recording medium is displayed on the display block for monitoring but this invention is not limited to this configuration; the processing of displaying on the display block may be omitted to record the imaging result stored in the memory to the video recording medium in the background while displaying an imaging result obtained by an image sensor on the display block.

In the above-mentioned embodiments, in the standard operation mode, an imaging result is obtained at field frequency 60 [fps] to be recorded to a video recording medium but this invention is not limited to this configuration; even in the standard operation mode, an image result may be obtained at field frequency 240 [fps] to be recorded to a video recording medium after executing field skipping on the imaging result.

In the above-mentioned embodiments, in the standard operation mode, an imaging result is obtained at field frequency 60 [fps] and, in the slow-motion taking mode, an imaging result is obtained at field frequency 240 [fps] but this invention is not limited to this configuration; these frequencies may be set to various other values as required within the spirit of this invention and this invention may be widely applied to the case where imaging results are obtained for recording by non-interlacing.

In the above-mentioned embodiments, an imaging result stored in the memory 2 at high speeds is read from the memory at the field frequency in the standard operating mode to be recorded to a video recording medium but this invention is not limited to this configuration; for example, an imagining result may be read from the memory at a frequency higher than the field frequency in the standard operation mode and lower than the frequency at which writing to memory is executed and the imaging result thus read may be recorded to the video recording medium. This configuration allows the storing of the imaging result stored in the memory into a video recording medium in a short time, thereby increasing a time margin for the repetition of slow-motion taking for example.

INDUSTRIAL APPLICABILITY

This invention is applicable to video cameras for example.

The invention claimed is:

1. An imaging apparatus comprising:

an imaging block configured to output an imaging result;

a memory configured to store said imaging result outputted from said imaging block;

an image recognition block configured to image-recognize said imaging result and output an image recognition result; and a control block configured to control an operation of each block;

wherein said control block, in a standard operation mode, outputs said imaging result from said imaging block at a first field frequency or a first frame frequency to record said imaging result to a recording medium and, in a slow-motion taking mode, outputs said imaging result from said imaging block at a second field frequency or a second frame frequency higher than said first field frequency or said first frame frequency to sequentially cyclically store said imaging result to said memory, and on the basis of said image recognition result, ends storing of said imaging result into said memory with reference to a timing with which a particular pattern in said imaging result is detected in a predetermined sequence, and reads said imaging result stored in said memory at a third field frequency or a third frame frequency lower than said second field frequency or said second frame frequency to record said imaging result to said recording medium, wherein said control block detects said particular pattern in said imaging result by matching a pattern area in said imaging result with one or more predetermined pixel values stored in a dictionary, and wherein said control block selects said matching area of said imaging result and the one or more predetermined pixel values in said dictionary based on whether the slow-motion taking mode is a first user-selectable slow-motion taking mode or a second user-selectable slow-motion taking mode.

2. The imaging apparatus according to claim 1, wherein said third field frequency or said third frame frequency is same as said first field frequency or said first frame frequency.

3. The imaging apparatus according to claim 1, wherein an image recognition subject to be image-recognized by said image recognition block is an image existing at a particular position in one screen.

4. The imaging apparatus according to claim 1, wherein said particular pattern to be detected by said predetermined sequence is a pattern for detecting a cue of a taking subject.

5. The imaging apparatus according to claim 1, wherein said particular pattern to be detected in said predetermined sequence is a particular pose to be detected by a sequence of operations of a taking subject.

6. The imaging apparatus according to claim 1, wherein said control block accepts a registration of said particular pattern in response to an operation done by a user.

7. The imaging apparatus according to claim 1, wherein said control block, in said slow-motion taking mode, during a period in which said imaging result is sequentially cyclically stored in said memory, converts a field frequency or frame frequency of said imaging result outputted from said imaging block into said first field frequency or frame frequency to record the converted imaging result to said recording medium.

8. A control method for an imaging apparatus comprising:

a recording step of a standard operation mode in which, in the standard operation mode, an imaging result is outputted from an imaging block at a first field frequency or first frame frequency to be recorded to a recording medium;

a writing step of a slow-motion taking mode in which, in the slow-motion taking mode, said imaging result is outputted from said imaging block at a second field frequency or a second frame frequency higher than said first field frequency or said first frame frequency to be sequentially cyclically stored in a memory; and a recording step of the slow-motion taking mode in which, in said slow-motion taking mode, on the basis of said image recognition result, with reference to a timing with which a particular pattern is detected in a predetermined sequence in said imaging result, storing of said imaging result into said memory is ended and said imaging result stored in said memory is read at a third field frequency or a third frame frequency lower than said second field frequency or said second frame frequency to be recorded to said recording medium, wherein said particular pattern in said imaging result is detected by matching a pattern area in said imaging result with one or more predetermined pixel values stored in a dictionary, and wherein said pattern area of said imaging result and the one or more predetermined pixel values in said dictionary are selected based on whether the slow-motion taking mode is a first user-selectable slow-motion taking mode or a second user-selectable slow-motion taking mode.

* * * * *

UNITED STATES PATENT AND TRADEMARK OFFICE

CERTIFICATE OF CORRECTION

PATENT NO. : 8,405,735 B2
APPLICATION NO. : 12/312949
DATED : March 26, 2013
INVENTOR(S) : Daisuke Miyakoshi It is certified that error appears in the above-identified patent and that said Letters Patent is hereby corrected as shown below:

On the Title Page, Item (54), and in the Specification, Column 1, lines 1-4, the title should read --SYSTEM AND METHOD FOR CONTROLLING RECORDING IN AN IMAGE PROCESSING APPARATUS IN A SLOW-MOTION TAKING MODE--.

Signed and Sealed this
Thirtieth Day of July, 2013

Teresa Stanek Rea
*Acting Director of the United States Patent and Trademark Office*